(12) United States Patent
Thonat et al.

(10) Patent No.: US 12,494,012 B2
(45) Date of Patent: Dec. 9, 2025

(54) RMIP: FAST TESSELLATION-FREE GPU DISPLACEMENT RAY TRACING VIA INVERSION AND OBLONG BOUNDING SIMULATION

(71) Applicant: Adobe Inc., San Jose, CA (US)

(72) Inventors: Theo Thonat, Issy les Moulineaux (FR); Tamy Boubekeur, Paris (FR); Iliyan Georgiev, London (GB); Francois Beaune, Annecy (FR)

(73) Assignee: Adobe Inc., San Jose, CA (US)

( * ) Notice: Subject to any disclaimer, the term of this patent is extended or adjusted under 35 U.S.C. 154(b) by 139 days.

(21) Appl. No.: 18/516,312

(22) Filed: Nov. 21, 2023

(65) Prior Publication Data

US 2025/0166280 A1 May 22, 2025

(51) Int. Cl.
*G06F 12/0875* (2016.01)
*G06F 17/30* (2006.01)
*G06T 15/06* (2011.01)
*G06T 17/20* (2006.01)

(52) U.S. Cl.
CPC .............. *G06T 15/06* (2013.01); *G06T 17/20* (2013.01)

(58) Field of Classification Search
None
See application file for complete search history.

(56) References Cited

U.S. PATENT DOCUMENTS

2020/0050550 A1\* 2/2020 Muthler .............. G06F 16/9027

OTHER PUBLICATIONS

NVIDIA Micro-Mesh, Available online at: https://developer.nvidia.com/rtx/ray-tracing/micro-mesh, 2024, pp. 1-5.
Vulkan Ray Tracing Final Specification Release, Khronos, Available Online at: https://www.khronos.org/blog/vulkan-ray-tracing-final-specification-release, Nov. 23, 2020, pp. 1-12.
Amir et al., Two-Dimensional Range Minimum Queries, Conference: Combinatorial Pattern Matching, 18th Annual Symposium, Jan. 2007, pp. 286-294.

(Continued)

*Primary Examiner* — Carl Adams
(74) *Attorney, Agent, or Firm* — Kilpatrick Townsend & Stockton LLP

(57) ABSTRACT

A system generates, based on a displacement bounds data structure and a triangle mesh modeling a surface of a 3D virtual object within a 3D virtual scene, a displaced triangle mesh including one or more displaced surface bounding prisms, each of the one or more displaced surface bounding prisms displaced from a respective base triangle of a plurality of base triangles of the triangle mesh structure based on displacement bounds defined in a displacement bounds data structure for an area of a 2D texture space corresponding to a location of the respective base triangle defined by the 3D virtual scene. The system performs, using the displaced triangle mesh structure, a ray tracing process for a ray associated with a pixel of a 2D image of the virtual scene including determining, responsive to determining the ray intersects the particular displaced surface bounding prism, a location of an intersection of the ray.

8 Claims, 10 Drawing Sheets

(56) References Cited

OTHER PUBLICATIONS

Baboud et al., Precomputed Safety Shapes for Efficient and Accurate Height-Field Rendering, Institute of Electrical and Electronics Engineers Transactions on Visualization and Computer Graphics, vol. 18, No. 11, Nov. 2012, pp. 1811-1823.
Brodal et al., On Space Efficient Two-Dimensional Range Minimum Data Structures, Algorithmica, vol. 63, 2012, 12 pages.
Carr et al., Fast GPU Ray Tracing of Dynamic Meshes Using Geometry Images, Graphics Interface, Jan. 2006, pp. 203-209.
Christensen et al., Ray Differentials and Multiresolution Geometry Caching for Distribution Ray Tracing in Complex Scenes, Computer Graphics Forum, vol. 22, Sep. 2003, 10 pages.
Djeu et al., Razor: An Architecture for Dynamic Multiresolution Ray Tracing, ACM Transactions on Graphics, vol. 30, No. 5, Oct. 2011, 15 pages.
Donnelly, Per-Pixel Displacement Mapping with Distance Functions, GPU Gems, vol. 2, No. 22, Jan. 2005, pp. 123-136.
Dummer, Cone Step Mapping: An Iterative Ray-heightfield Intersection Algorithm, Lonesock, Available Online at:https://www.scribd.com/document/57896129/Cone-Step-Mapping, 2006, 14 pages.
Fischer et al., Space-Efficient Preprocessing Schemes for Range Minimum Queries on Static Array, SIAM Journal on Computing, vol. 10, No. 2, 2011, pp. 1-28.
Greene et al., Hierarchical Z-Buffer Visibility, Available online at: https://dl.acm.org/doi/pdf/10.1145/166117.166147, Sep. 1, 1993, 7 pages.
Hanika et al., Two-Level Ray Tracing with Reordering for Highly Complex Scenes, Proceedings of Graphics Interface, Jan. 2010, pp. 145-152.
Harada, Rendering Vector Displacement-Mapped Surfaces in a GPU Ray Tracer, GPU Pro 6: Advanced Rendering Techniques, Oct. 2018, pp. 459-474.
Hart, Sphere Tracing: A Geometric Method for the Antialiased Ray Tracing of Implicit Surfaces, The Visual Computer, vol. 12, No. 10, Jun. 1995, 50 pages.
Heidrich et al., Ray-Tracing Procedural Displacement Shaders, Graphics Interface, Dec. 2000, 9 pages.
Hunt et al., Fast and Lazy Build of Acceleration Structures from Scene Hierarchies, Institute of Electrical and Electronics Engineers Symposium on Interactive Ray Tracing, Sep. 2007, 8 pages.
Jeschke et al., Interactive Smooth and Curved Shell Mapping, Proceedings of the 18th Eurographics Conference on Rendering Techniques, Jun. 2007, pp. 351-360.
Kaneko et al., Detailed Shape Representation with Parallax Mapping, In Proceedings of the ICAT, Dec. 5-7, 2001, 4 pages.
Kuznetsov et al., NeuMIP: Multi-Resolution Neural Materials, ACM Transactions on Graphics, vol. 40, No. 4, Article 175, Aug. 2021, 13 pages.
Kuznetsov et al., Rendering Neural Materials on Curved Surfaces, In Special Interest Group on Computer Graphics and Interactive Techniques Conference Proceedings, Aug. 7-11, 2022, 9 pages.
Lee et al., Improved Relief Texture Mapping Using Minmax Texture, Fifth International Conference on Image and Graphics, Sep. 2009, pp. 1-5.
Logie et al., Inverse Displacement Mapping in the General Case, In Computer Graphics Forum, vol. 14, No. 5, Dec. 1995, pp. 261-273.
Oh et al., Pyramidal Displacement Mapping: A GPU Based Artifacts-Free Ray Tracing Through an Image Pyramid, VRST '06: Proceedings of the ACM Symposium on Virtual Reality Software and Technology, Nov. 2006, 8 pages.
Patterson et al., Inverse Displacement Mapping, Computer Graphics Forum, vol. 10, Mar. 1991, pp. 129-139.
Policarpo et al., Real-Time Relief Mapping on Arbitrary Polygonal Surfaces, Proceedings of the 2005 Symposium on Interactive 3D Graphics and Games, Apr. 2005, 8 pages.
Policarpo et al., Relaxed Cone Stepping for Relief Mapping, Available Online at: https://www.researchgate.net/publication/255571970_Relaxed_Cone_Stepping_for_Relief_Mapping, Jan. 2007, pp. 1-16.
Porumbescu et al., Shell Maps, Available Online at: https://dl.acm.org/doi/10.1145/1073204.1073239, Jul. 2005, pp. 626-633.
Sanzharov et al., Survey of Nvidia RTX Technology, Programming and Computing Softwar, vol. 46, No. 4, Jul. 1, 2020, pp. 297-304.
Shopf et al., March of the Froblins: Simulation and Rendering Massive Crowds of Intelligent and Detailed Creatures on GPU, Special Interest Group on Computer Graphics and Interactive Techniques, Aug. 2008, pp. 52-101.
Smits et al., Direct Ray Tracing of Displacement Mapped Triangles, In Eurographics Workshop on Rendering Techniques, Jun. 26, 2000, pp. 1-13.
Szirmay-Kalos et al., Specular Effects on the GPU: State of the Art, In Computer Graphics Forum, Wiley Online Library, vol. 28, Sep. 16, 2009, pp. 1-31.
Tatarchuk, Dynamic Parallax Occlusion Mapping with Approximate Soft Shadows, In Proceedings of the 2006 Symposium on Interactive 3D Graphics and Games, Mar. 14, 2006, pp. 63-69.
Tevs et al., Maximum Mipmaps for Fast, Accurate, And Scalable Dynamic Height Field Rendering, In Proceedings of the 2008 Symposium on Interactive 3D Graphics and Games, Feb. 15, 2008, 8 pages.
Thonat et al., Tessellation-Free Displacement Mapping for Ray Tracing, ACM Transactions on Graphics, vol. 40, No. 6, Dec. 14, 2021, 2 pages.
Wald et al., Embree: A Kernel Framework for Efficient CPU Ray Tracing, ACM Transactions on Graphics, vol. 33, No. 4, Jul. 2014, pp. 143:1-143:8.
Wang et al., Generalized Displacement Maps, The Eurographics Association, Jan. 2004, 8 pages.
Wang et al., View-Dependent Displacement Mapping, ACM Transactions on Graphics, vol. 22, No. 2, Jul. 2003, pp. 334-339.
Yerex et al., Displacement Mapping with Ray-Casting in Hardware, In Proceedings of SIGGRAPH, Aug. 2004, 1 page.
Yuan et al., Data Structures for Range Minimum Queries in Multidimensional Arrays, In Proceedings of the Twenty-first Annual ACM-SIAM Symposium on Discrete Algorithms, SIAM, Jan. 2010, pp. 150-160.

* cited by examiner

400

410
ACCESSING A TRIANGLE MESH MODEL REPRESENTING A SURFACE OF A THREE-DIMENSIONAL (3D) VIRTUAL OBJECT WITHIN A VIRTUAL SCENE AND A TWO-DIMENSIONAL (2D) DISPLACEMENT TEXTURE MAP DEFINING A TEXTURE FOR THE SURFACE OF THE 3D VIRTUAL OBJECT

420
GENERATING, BASED ON THE 2D DISPLACEMENT TEXTURE MAP, A DISPLACEMENT BOUNDS DATA STRUCTURE THAT DEFINES DISPLACEMENT BOUNDS OVER ONE OR MORE REGIONS IN A TEXTURE SPACE

430
GENERATING, BASED ON THE TRIANGLE MESH MODEL AND THE DISPLACEMENT BOUNDS DATA STRUCTURE, A DISPLACED TRIANGLE MESH MODEL COMPRISING A PLURALITY OF DISPLACED SURFACE BOUNDING PRISMS, EACH DISPLACED SURFACE BOUNDING PRISM DISPLACING A RESPECTIVE BASE TRIANGLE OF THE MESH MODEL BY A MINIMUM AND MAXIMUM HEIGHT DEFINED BY THE DISPLACEMENT BOUNDS DATA STRUCTURE

440
DETERMINING A PIXEL VALUE FOR EACH PIXEL OF A 2D IMAGE OF THE VIRTUAL SCENE BY PERFORMING A RAY TRACING PROCESS USING THE DISPLACED TRIANGLE MESH MODEL, WHEREIN THE RAY TRACING PROCESS INCLUDES PERFORMING AN ITERATIVE BOUNDS REDUCTION PROCESS WHEN A RAY INTERSECTS A BOUNDING PRISM OF THE DISPLACED TRIANGLE MESH MODEL

450
DISPLAYING, VIA A USER INTERFACE, THE 2D IMAGE OF THE VIRTUAL SCENE WITH THE PIXEL VALUES DETERMINED USING THE RAY TRACING PROCESS

*FIG. 4*

RMIP: FAST TESSELLATION-FREE GPU DISPLACEMENT RAY TRACING VIA INVERSION AND OBLONG BOUNDING SIMULATION

TECHNICAL FIELD

This disclosure generally relates to techniques for rendering textured virtual objects that are textured with a displacement map. More specifically, but not by way of limitation, this disclosure relates to improvements for rendering such textured objects via ray tracing.

BACKGROUND

Conventional modeling systems can model a textured surface of an object (e.g., a tire surface over a tire-shaped object) by superimposing a two-dimensional (2D) displacement map over a three-dimensional (3D) object surface.

SUMMARY

The present disclosure describes techniques for rendering an image of a textured virtual object. A three-dimensional (3D) scene rendering system generates, based on a displacement bounds data structure and a triangle mesh structure that models a surface of a 3D virtual object within a 3D virtual scene, a displaced triangle mesh structure. The displaced triangle mesh structure includes one or more displaced surface bounding prisms, each displaced surface bounding prism displaced from a base triangle of a plurality of base triangles of the triangle mesh structure based on displacement bounds defined in a displacement bounds data structure for an area of a two-dimensional (2D) texture space corresponding to a location of the base triangle in the 2D texture space as defined by the 3D virtual scene. The scene rendering system performs, using the displaced triangle mesh structure, a ray tracing process for a ray associated with a pixel of a 2D image of the virtual scene. Performing the ray tracing process includes determining, responsive to determining that the ray intersects a particular displaced surface bounding prism of the one or more displaced surface bounding prisms in the 3D virtual space, a location of an intersection of the ray in the 2D texture space and defining a color response (e.g. color value) for the pixel based on the determined location of intersection. The scene rendering system provides for display, via a user interface, the 2D image of the virtual scene comprising the pixel having the defined color response.

Various embodiments are described herein, including methods, systems, non-transitory computer-readable storage media storing programs, code, or instructions executable by one or more processing devices, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 4 depicts a method for rendering via ray tracing, using an RMIP data structure and an iterative bound reduction process, a 2D image of a scene including an object with a textured surface, according to certain embodiments disclosed herein, according to certain embodiments disclosed herein.

DETAILED DESCRIPTION

Figure 1:
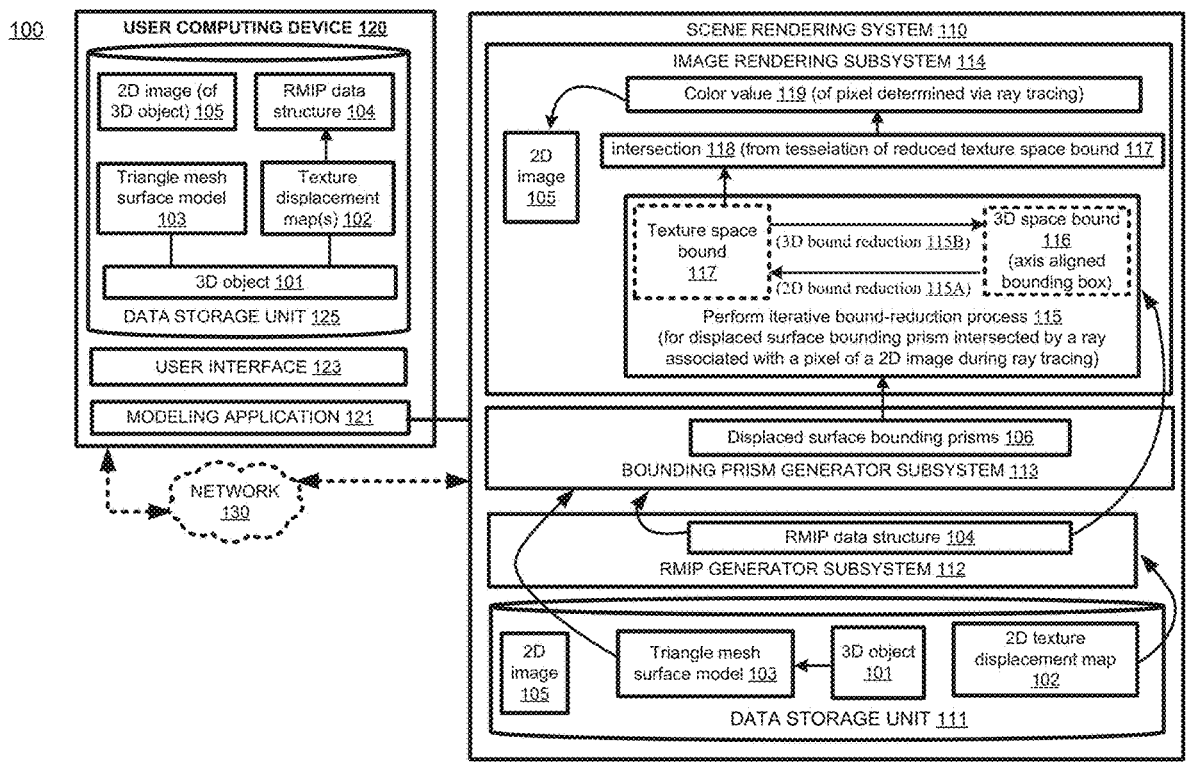
FIG. 1 depicts an example of a computing environment for rendering, via ray tracing, a 2D image of a scene including an object with a textured surface using an RMIP data structure and an iterative bound reduction process, according to certain embodiments disclosed herein.

In the following description, for the purposes of explanation, specific details are set forth in order to provide a thorough understanding of certain embodiments. However, it will be apparent that various embodiments may be practiced without these specific details. The figures and description are not intended to be restrictive. The words "exemplary" or "example" are used herein to mean "serving as an example, instance, or illustration." Any embodiment or design described herein as "exemplary" or "example" is not necessarily to be construed as preferred or advantageous over other embodiments or designs.

In conventional scene rendering systems, an object can be represented by a 3D base geometry with a 2D texture displacement map representing a displacement from a surface of the 3D base geometry. The 3D base geometry can be a triangle mesh model representing a surface of a 3D object. For example, a tire object can be represented by a smooth base geometry with a 2D texture displacement map representing tire surface features from the surface of the mesh object. Such displacement mapping to model textured surfaces is a powerful mechanism to enrich base 3D meshes with high-frequency details and mesostructures, offloading most of the resulting representation to the 2D texture displacement map. This 2D texture displacement map indicates, for any point on the surface, a displacement value (e.g., a height or depth). For example, a displacement value can indicate a positive, zero, or negative displacement of an associated point on the surface. Displacement values can, therefore, define surface features that include one or more of bumps, projections, dips, holes, indentions, or other surface features that can be defined using displacement values of points on the 2D texture displacement map. At rendering time, the base geometry is deformed following the 2D texture displacement map to recover a full-resolution shape. As such, a large part of shape processing and management for rendering a scene that includes a textured object can be performed on the low-resolution base geometry, leveraging the random-accessible nature of the 2D texture displacement map to provide easy level of detail, compression, and filtering. However, conventional scene rendering systems perform texture displacement mapping as a preprocess, which requires maintaining a high-resolution base geometry mesh during rendering and which results in subsampling artifacts in the rendered scene.

Certain conventional scene rendering systems use bounding volume hierarchies generated over a base geometry mesh to accelerate rendering computations, such as ray-surface intersection test, however, such conventional bounding hierarchies require first determining a high-resolution geometry (a high-resolution triangular mesh). However, such conventional bounding hierarchies require explicit realization of high-resolution geometry after tessellation and displacement, which fails at reproducing complex displacement maps over arbitrary macro domains, requires a large memory footprint, are intractable when the texture displacement content is dynamic, and may not be feasible when tiling the texture displacement over the domain.

Further, certain conventional scene rendering systems may provide tessellation-free displacement mapping (TFDM), which is an effective alternative to explicit displacement meshing. However, while conventional TFDM provides full accuracy for rendering virtual objects, it exhibits limited execution performance.

Certain embodiments described herein address the limitations of conventional scene rendering systems that use TFDM by providing a rectangular minmax image pyramid (RMIP) data structure, which provides displacement bounds for arbitrary axis-aligned rectangular regions in 2D texture space. Using the RMIP data structure, the scene rendering system can predict displacement map subregions that are likely to intersect a ray during ray tracing. The RMIP data structure described herein supports defining subregions with a rectangular shape, enabling determination of tight bounds between the 2D texture displacement map space and a 3D ray space, to quickly narrow down the search for an intersection in an iterative front-to-back manner. The RMIP data structure described herein enables the scene rendering system to reduce a number of traversal steps by over an order of magnitude. For example, each traversal step in conventional approaches involves determining intersection endpoints of a ray on a 3D object space bound (e.g., an axis aligned bounding box ("AABB")), subdividing a bound in texture space based on determined endpoints in the 3D object space bound, and subdividing the 3D object space bound based on the subdivided texture bound. Compared to conventional traversal hierarchies which depend only on geometric content (e.g., base triangles of a triangle mesh and a displacement map) and which have rigid 3D AABBs that do not depend on the query ray, the methods described herein determine 2D and 3D bounds that are unique to each query ray. Using the RMIP data structure and the iterative bound determination process described herein described herein to predict precise bounds for ray intersection enables an increase in processing speed for rendering a scene of up to ten times or more compared to conventional approaches, while also preserving the same rendering accuracy of conventional TFDM approaches.

Figure 2:
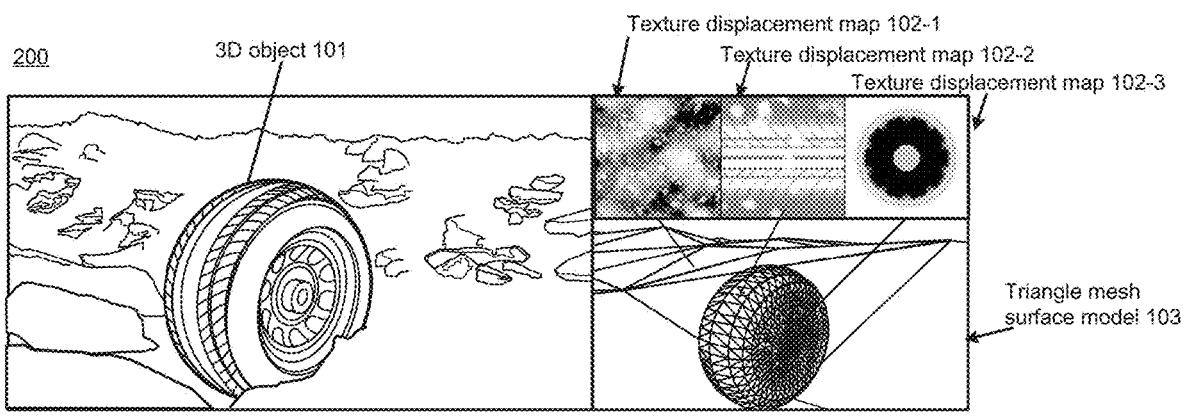
FIG. 2 illustrates a scene including 3D object with a textured surface modeled by a triangle mesh surface model and 2D texture surface maps, according to certain embodiments disclosed herein.

The following non-limiting example is provided to introduce certain embodiments. In this example, a scene rendering system accesses a triangle mesh model representing a surface of a three-dimensional (3D) virtual object within a virtual scene and a displacement texture map defining a texture for at least a portion of the surface of the 3D virtual object. The 3D virtual object may include defined dimensions, contours, or other information which defines the 3D virtual object within the 3D virtual space. For example, the scene rendering system accesses the triangle mesh model and the displacement texture map from a data storage unit. In some instances, a single displacement texture map defines a texture (e.g., a relief) for an entirety of the surface area of the 3D virtual object. For example, the scene rendering system models a Styrofoam ball with a triangle mesh model representing a surface of a sphere and a 2D texture displacement map modeling a texture of Styrofoam. In some instances, the multiple displacement texture maps define respective textures for the surface area of the 3D virtual object. For example, a first displacement texture map defines a first texture for a first region of the surface area, a second displacement texture map defines a second texture for a second region of the surface area, and so forth. In some instances, scene rendering system can receive inputs from a user via a user interface selecting a virtual object and a texture for the virtual object and retrieve the triangle mesh model representing a surface of the selected virtual object and the displacement texture map corresponding to the selected texture responsive to receiving the inputs. FIG. 2 illustrates an example of a triangle mesh model and texture displacement maps for modeling a textured 3D virtual object.

Figure 9:
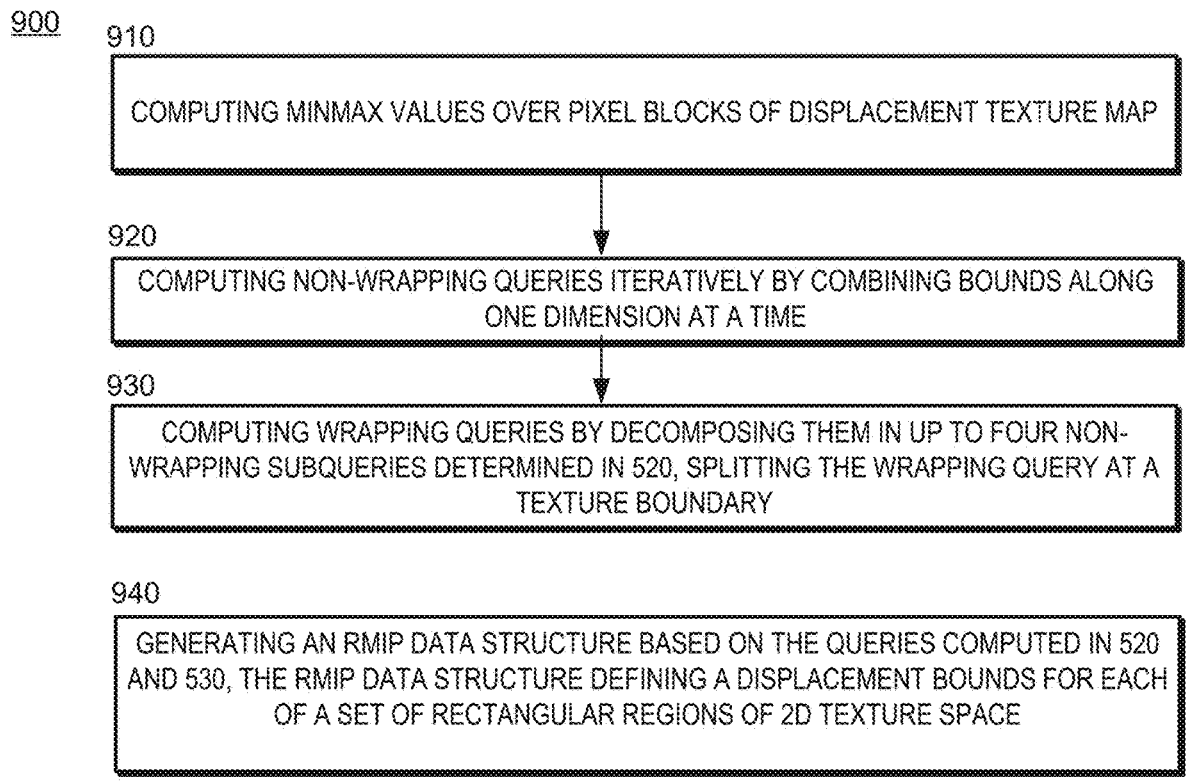
FIG. 9 depicts a method for generating an RMIP data structure that can be used with the method described in FIG. 4, according to certain embodiments described herein.
Figures 10, 11:
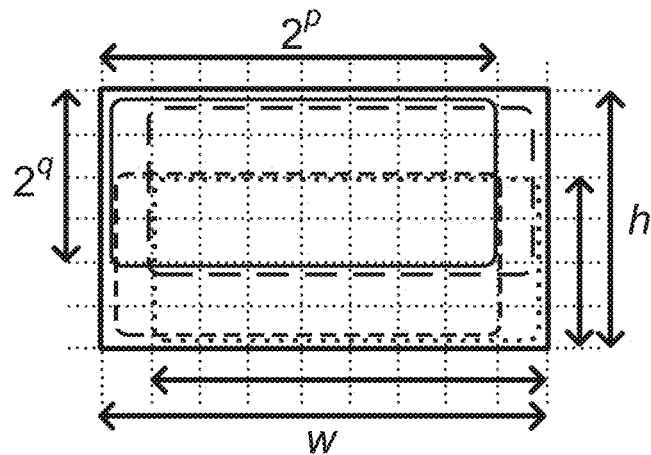
FIG. 10 depicts an example of computing minmax values for generation of an RMIP data structure, according to certain embodiments described herein.
FIG. 11 illustrates an example RMIP data structure that can be used with the method described in FIG. 4 and that can be generated according to the method described in FIG. 8, according to certain embodiments described herein.

The scene rendering system generates a displacement bounds structure based on the 2D displacement texture map. The displacement bounds structure defines displacement bounds over one or more regions in a texture space. For example, the 2D displacement texture map represents the texture space. For example, the 2D displacement texture map defines, for each section (e.g., square block shaped section) of the map, a displacement value representing a height or depth of displacement of the level surface to form the texture corresponding to the map. In certain embodiments, the regions comprise rectangular regions. For example, the displacement bounds structure, in certain examples, comprises a rectangular minmax image pyramid (RMIP) data structure. The RMIP data structure stores displacement bounds over rectangles of various size and shape in texture space. In certain examples, the RMIP data structure defines a minimum displacement bound for one or more rectangular regions in the texture space. In certain examples, the RMIP data structure defines a maximum displacement bound for the one or more rectangular regions in the texture space. In certain examples, the RMIP data structure defines, for the one or more rectangular regions in the texture space, both a minimum displacement bound and a maximum displacement bound. Further details concerning how to generate the displacement bounds structure are described in FIGS. 9-10 herein and an example of an RMIP data structure generated using the methods described herein is illustrated in FIG. 11 herein. In certain embodiments, the scene rendering system can define a minimum and/or maximum displacement bound for regions of various shapes (e.g., including nonrectangular shaped regions) in the displacement bounds structure. For example, once generated, the RMIP data structure described herein can be used to determine min/max displacement bounds queries for any rectangular shape, or for any shape that fits into a rectangle (e.g., squares). As illustrated in FIG. 11, the RMIP data structure itself comprises pre-computed rectangular (including square) queries.

Figure 3:
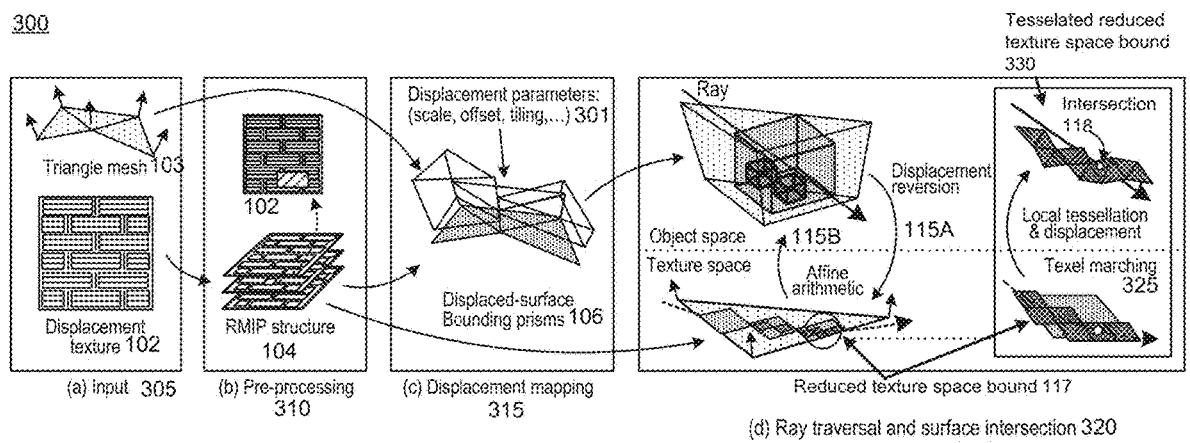
FIG. 3 illustrates a method for generating an RMIP data structure from a displacement texture map, generating a displaced triangle mesh model based on a triangle mesh and the RMIP data structure, performing an iterative bound reduction process during ray tracing to determine a reduced texture space bound, and performing a texel marching process on the reduced 2D bound, according to certain embodiments disclosed herein.

The scene rendering system generates a displaced triangle mesh model comprising a plurality of displaced bounding prisms. The scene rendering system generates the displaced triangle mesh model based on the triangle mesh model and the displacement bounds data structure (e.g., RMIP data structure). Each bounding prism is displaced from its respective base triangle on the triangle mesh model at a minimum height and/or a maximum height defined by the displacement bounds data structure. FIG. 3 illustrates, among other features, an example of displaced bounding prisms.

The scene rendering system determines a pixel value for each pixel of a 2D image of the virtual scene by performing a ray tracing process using the displaced triangle mesh model. The ray tracing process involves performing an iterative traversal process when a ray intersects a bounding prism of the displaced triangle mesh model. The iterative traversal process involves determining an initial 3D bound in 3D space and, from the initial 3D bound, an initial 2D rectangular bound in a texture space defined by the displacement texture map. For example, the initial 3D bound is the displaced bounding prism intersected by the ray. The iterative traversal process also includes determining intersection endpoints of the ray on the 3D prism and projecting the endpoints to the texture space to define a reduced rectangular bound for the ray. The reduced 2D rectangular bound is tighter than the initial 2D rectangular bound. Further details about the iterative traversal process are described in FIG. 4 and FIG. 5. The iterative traversal process is repeated until the reduced rectangular bound is less than threshold dimensions and then the scene rendering system performs a texel marching process on the reduced 2D rectangular bound. The texel marching process involves a direct intersection test with a local reconstruction of the displaced surface. In certain embodiments, the threshold dimensions can be varied. In some instances, the threshold dimensions are larger than dimensions of a texel. Performing the texel marching process on the reduced 2D rectangular bound results in identifying a precise surface location of the intersection of the ray. In some instances, a pixel value (e.g., a color response) for the pixel associated with the ray in the 2D image is determined in accordance with the determined location of the ray's intersection.

The scene rendering system displays, via a user interface, the 2D image of the virtual scene with the pixel values determined using the ray tracing process. For example, the scene rendering system determines a color response for each pixel of the 2D image using the ray marching process and the displaced triangle mesh model. As explained previously, this ray marching process includes, when a ray intersects a bounding prism of the displaced triangle mesh model, performing the iterative bound reduction process and the texel marching process on the reduced 2D bound generated via the iterative bound reduction process.

The embodiments described herein, specifically generating and using a displacement bounds data structure (e.g., RMIP data structure) to model texture displacement and using the iterative bound reduction, significantly improves the functioning of rendering interfaces over conventional modeling interfaces. As previously discussed, in conventional modeling interfaces, conventional scene rendering systems perform texture displacement mapping as a preprocess, which requires maintaining a high-resolution base geometry mesh during rendering and which results in sub-sampling artifacts in the rendered scene. Further certain conventional scene rendering systems apply bounding volume hierarchies to a base geometry mesh, however, such conventional bounding hierarchies require first determining a high-resolution geometry (a high-resolution triangular mesh). However, such conventional bounding hierarchies require explicit realization of high-resolution geometry after tessellation and displacement, which fails at reproducing complex displacement maps over arbitrary macro domains, requires a large memory footprint, are intractable when the texture displacement content is dynamic, and may not be feasible when tiling the texture displacement over the domains.

Using the RMIP data structure to represent the displacement texture of an object, as described herein, which is used to generate the displaced triangle mesh model, improves the accuracy of estimated displacement bounds over conventional approaches, which use minmax mipmaps having rigid square shaped regions to determine such bounds. These square shaped bounds of the conventional approach are loose and, accordingly, the resulting 3D surface bounds are loose as well. The RMIP data structure described herein, unlike conventional minmax mipmaps having rigidly defined square shaped regions, provides displacement bounds for arbitrary axis-aligned rectangular regions in 2D texture space. By using the RMIP data structure described herein, the scene rendering system avoids rigid conventional traversal hierarchies and enables using texture space efficiently based on the specific ray-triangle configuration. For example, the RMIP data structure described herein stores scalar displacement bounds over rectangular regions of various size and shape in the 2D texture space and therefore enables computation of a more accurate displacement bounds for any specific region/area of the 2D displacement texture map.

Further, using the iterative bounds reduction process with the displayed triangle mesh model during ray tracing, as described herein, increases an accuracy of rendered scene images over conventional ray tracing processes and also reduces a bandwidth usage over conventional ray tracing processes for 2D image rendering. The iterative bounds reduction process described herein tracks tight ray-interval bounds in 2D texture space and enables bidirectional reduction of the bounds between the 2D texture space and the 3D object space. Each of the 2D texture space and the 3D object space includes unique information that is leveraged in the iterative bounds reduction process to effectively tighten the bound in the other space. Subdividing the 2D texture space bound, for example, yields tighter scalar displacement bounds and thus tighter 3D-surface bounds (e.g., represented as subdivided AABBs) in the 3D object space. Determining intersections with the subdivided AABBs then tightens the valid ray interval and shrinks its 2D footprint in the 2D texture pace. This iterative back and forth process which alternately reduces the bounds in 2D texture space and 3D object space, increases a speed of bound reductions and reduce a number of traversal steps and, accordingly, bandwidth usage, over conventional processes.

Example Operating Environment for Rendering, Via Ray Tracing, a 2D Image of a Scene Including an Object with a Textured Surface Using an RMIP Data Structure and an Iterative Bound Reduction Process Referring now to the drawings, FIG. 1 depicts an example of a computing environment 100 for rendering via ray tracing, using an RMIP data structure 104 and an iterative bound reduction process 115, a 2D image 105 of a scene including an object with a textured surface. The computing environment 100 includes a scene rendering system 110, which can include one or more processing devices that execute an RMIP generator subsystem 112, a displaced prism generator system 113, and an image rendering subsystem 114. In certain embodiments, each of the RMIP generator subsystem 112, the displaced prism generator system 113, and the image rendering subsystem 114 is a network server or other computing device connected to a network 130.

The RMIP generator subsystem 112 accesses or otherwise receives a scene including a 3D object 101 represented by a triangle mesh surface model 103 and one or more 2D displacement texture maps 102 associated with the triangle mesh surface model 103 and defining a texture to the surface of the object. In certain examples, the RMIP generator subsystem 112 generates the triangle mesh surface model 103 of the object from a 3D base geometry of the 3D object 101. For example, the 3D base geometry of the object is a sphere and the triangle mesh surface model 103 models the surface of the sphere. FIG. 2 depicts an example of 2D displacement texture maps 102 and a triangle mesh surface model 103 that are used to model an example object. The RMIP generator subsystem 112 generates an RMIP data structure 104 based on one or more displacement texture maps 103 defining a texture for one or more regions of a 3D object 101 surface. In certain examples, a single displacement texture map 103 defines a texture for an entire surface of the 3D object 101. In certain examples, a first displacement texture map 103 defines a first texture for a first region of the 3D object 101 surface, a second displacement texture map 103 defines a second texture for a second region of the 3D object 101 surface, and so forth. The RMIP data structure 104 defines a minimum displacement bound for one or more rectangular regions in the texture space. In certain examples, the RMIP data structure 104 defines, for the one or more rectangular regions in the texture space, both a minimum displacement bound and a maximum displacement bound. The RMIP generator subsystem 112 stores the RMIP data structure 104 in the data storage unit 111. FIG. 9 describes a method for generating the RMIP data structure 104 and FIG. 11 depicts an example of an RMIP data structure 104.

The bounding prism generator subsystem 113 generates a displaced triangle mesh model comprising a set of displaced surface bounding prisms 106. The bounding prism generator subsystem 113 generates a displaced surface bounding prism 106 for each base triangle of the triangle mesh surface model 103 using bounds defined by the RMIP data structure 104 for the region in texture space corresponding to the region in 3D object 101 space of the base triangle. The bounding prism generator subsystem 113 organizes the set of displaced surface bounding prisms 106 into a static bounding volume hierarchy.

The image rendering subsystem 114 renders a 2D image 105 of the scene that includes the 3D object 101 by performing a ray tracing process to determine a color value for each pixel of the 2D image 105. For each pixel of the 2D image 105, the image rendering subsystem 114 projects a ray through the pixel into the 3D object space of the scene that includes the displaced triangle mesh model and determines a color value for the pixel. When a ray intersects a displaced surface bounding prism 106 of the displaced triangle mesh model, the image rendering subsystem 114 performs an iterative bound reduction process 115. The iterative bound reduction process 115 involves alternately performing a 2D bound reduction 115A to reduce a texture space bound 117 and a 3D bound reduction 115B to reduce a 3D object space bound 116, and so forth. For example, the initial 3D space bound is the intersected displaced surface bounding prism 106. The image rendering subsystem 114 performs the iterative bound reduction process 115 until the reduced texture space bound 117 is less than threshold dimensions. With the reduced texture space bound 117, the image rendering subsystem 114 performs a texel marching process to determine the color value for the ray/pixel. Further details concerning performing the iterative bound reduction process 115 are described in FIG. 5, FIG. 6, and FIG. 7.

The scene rendering system 110 includes a data storage unit 111. An example data storage unit 111 is accessible to the scene rendering system 110 and stores data for the scene rendering system 110. In some instances, the data storage unit 111 stores a 3D object 101, one or more displacement texture maps 102 associated with one or more regions of a surface of the 3D object 101, a triangle mesh surface model 103 modeling the surface of the 3D object. In some instances, the scene rendering system 110 stores the RMIP data structure 104 in the data storage unit 111. In some instances, the scene rendering system 110 stores the 2D image 105 of the scene generated by the scene rendering system 110.

An example user computing device 120 includes a modeling application 121, a user interface 123, and a data storage unit 125. In certain embodiments, the user computing device 120 is a smart phone device, a personal computer (PC), a tablet device, or other user computing device 120. In some embodiments, the user computing device 120 communicates with the scene rendering system 110 via the network 130. In some embodiments, the scene rendering system 110 is a component of the modeling application 121.

The modeling application 121, in some embodiments, is associated with the scene rendering system 110 and the user downloads the modeling application 121 on the user computing device 120. For example, the user accesses an application store or a website of the scene rendering system 110 using the user computing device 120 and requests to download the modeling application 121 on the user computing device 120. The modeling application 121 operates on the user computing device 120 and enables a user of the user computing device 120 to retrieve a scene including a 3D object 101 for display via the user interface 123. The modeling application 121 enables the user to interact, via the user interface 123 with the scene rendering system 110. The modeling application 121 can communicate with the user interface 123 to receive one or more inputs from the user. The modeling application 121 can instruct the user interface 123 to display a 2D image 105 of the scene rendered by the scene rendering system 110. In some embodiments, the modeling application 121 communicates with one or more of the RMIP generator subsystem 112, the bounding prism generator subsystem 113, the image rendering subsystem 114, or the data storage unit 111 of the scene rendering system 110. In certain embodiments, the modeling application 121 includes the RMIP generator subsystem 112, the bounding prism generator subsystem 113, the image rendering subsystem 114 and performs the operations described herein as being performed by the subsystems 112, 113, and 114.

The user interface 123 can include a touchscreen display interface, a display device (e.g., a monitor) with a separate input device (e.g., a mouse), or other user interface 123 which can receive one or more inputs from the user and display information or provide other output to the user. For example, the user interface 123 can display a scene including a 3D object 101 and a one or more 2D images 105 of the scene rendered by the scene rendering system 110. In some instances, the user interface 123 receives one or more inputs from the user, in some instances, to generate the 3D object 101, select one or more displacement texture maps 102 to associate with regions of the surface of the 3D object 101, change a virtual camera position and viewing angle for rendering a 2D image 105 of the scene, and request a 2D image 105 to be rendered for the scene.

The data storage unit 125 is accessible to the user computing device 120 and stores data for the user computing device 120. In some instances, the data storage unit 125 stores a 3D object 101, one or more displacement texture maps 102 associated with one or more regions of a surface of the 3D object 101, a triangle mesh surface model 103 modeling the surface of the 3D object. In some instances, the scene rendering system 110 stores the RMIP data structure 104 in the data storage unit 125. In some instances, the scene rendering system 110 stores the 2D image 105 of the scene generated by the scene rendering system 110. In some instances, the data storage unit 125 is accessible to the scene rendering system 110 via the network 130. For example, the scene rendering system 110 can access data stored in the data storage unit 125 via the network 130.

As depicted in FIG. 1, the scene rendering system 110 can access a triangle mesh surface model 103 that models a surface of a 3D object 101. In some instances, the scene rendering system 110 generates the triangle mesh surface model 103 for the 3D object 101. The scene rendering system 110 also accesses one or more 2D displacement texture maps 102 that model a surface displacement (e.g., texture) for one or more corresponding regions of the surface of the 3D object 101. As depicted in FIG. 1, the scene rendering system 110 can generate an RMIP data structure 104 based on the one or more displacement texture maps 102 defining displacement bounds for one or more rectangular regions of texture space. The scene rendering system 110, based on bounds defined by the RMIP data structure 104 and based on the triangle mesh surface model 103, generates a displaced triangle mesh surface model including a set of displaced surface bounding prisms 106. The scene rendering system 110 conducts a ray tracing process to determine pixel color values 109 for each pixel of a 2D image 105 of the scene including the 3D object 101. As depicted in FIG. 1, as part of this ray tracing process, the scene rendering system 110 can use the displaced triangle mesh surface model including the generated displaced surface bounding prisms 106. When, during the ray tracing process, a ray intersects a displaced surface bounding prism 106, the scene rendering system 110 performs an iterative bound-reduction process 115 to determine a reduced texture space bound 117 to predict where the ray intersects with the surface texture of the office. From the reduced texture space bound 117, the scene rendering system 110 can perform a texel marching process, which involves a direct intersection test with a local reconstruction of the displaced surface to determine a precise intersection 118 location of the ray. Based on the determined intersection 118, in some instances, the scene rendering system 110 can determine a pixel color value 109 or other response or value for the pixel associated with the ray. In some instances, the scene rendering system 110 renders a 2D image 105 having the pixel color values 109 determined via ray tracing process for each pixel of the 2D image 105.

The scene rendering system 110, including the RMIP generator subsystem 112, the bounding prism generator subsystem 113, and the image rendering subsystem 114, may be implemented using software (e.g., code, instructions, program) executed by one or more processing devices (e.g., processors, cores), hardware, or combinations thereof. The software may be stored on a non-transitory storage medium (e.g., on a memory component). The computing environment 100 depicted in FIG. 1 is merely an example and is not intended to unduly limit the scope of claimed embodiments. One of the ordinary skill in the art would recognize many possible variations, alternatives, and modifications. For example, in some implementations, the scene rendering system 110 can be implemented using more or fewer systems or subsystems than those shown in FIG. 1, may combine two or more subsystems, or may have a different configuration or arrangement of the systems or subsystems. Examples of Computer-Implemented Operations for Rendering, Via Ray Tracing, a 2D Image of a Scene Including an Object with a Textured Surface Using an RMIP Data Structure and an Iterative Bound Reduction Process In the embodiments described herein, the scene rendering system 110 can render a 2D image 105 of a scene that includes a 3D object 101 via a ray tracing process, using a displaced triangle mesh model generated using base triangles of a triangle mesh surface model 103 displaced by a scalar displacement texture map 102. To determine the displacement caused by the displacement texture map 102, the scene rendering system 110 generates an RMIP data structure 104 that provides displacement bounds over regions of a 2D texture space of the 2D displacement texture map 102. The scene rendering system 110 then determines a displacement for each of the displaced surface bounding prisms 106 of the displaced triangle mesh model based on the displacement bounds defined by the RMIP data structure 104. During the ray tracing process, for any ray that intersects a displaced surface bounding prism 106, the scene rendering system 110 performs an iterative bound-reduction process 115 to alternately tighten the bound in the 2D texture space and the 3D object 101 space until the bound in the 2D texture space is less than threshold dimensions. When the 2D texture space bound is less than the threshold dimensions, the scene rendering system 110 performs ray marching along the displacement texels that the ray spans, reconstructing and testing the displaced 3D object 101 surface for intersections for each texel locally to find an exact point of intersection 118 of the ray at the 3D object surface and, in some instances, a color value 119 for the pixel associated with the ray based on the determined point of intersection 118. FIGS. 2-10 provide further details about these features.

FIG. 2 illustrates a scene 200 depicting a 3D object 101 with a textured surface modeled by a triangle mesh surface model 103 and 2D displacement texture maps 102-1, 102-2, and 102-3, according to certain embodiments disclosed herein. As depicted in FIG. 2, the texture displacement map 102-2 models a tread of a tire region of the 3D wheel object 101 and the texture displacement map 102-3 models a side wall of the tire region of the 3D wheel object 101 and a rim region of the wheel 3D object 101. In the example scene 200, the texture displacement map 102-1 defines a background texture (e.g., the rocks depicted in the background) for the scene.

FIG. 3 illustrates a method 300 for generating an RMIP data structure 104 from a displacement texture map 102, generating a displaced triangle mesh model based on a triangle mesh surface model 103 and the RMIP data structure 104, performing an iterative bound reduction process 115 during ray tracing to determine a reduced texture space bound 117, and performing a texel marching process on the reduced texel space bound, according to certain embodiments disclosed herein. As disclosed in FIG. 3, the method 300 includes an input 305 step, a pre-processing 310 step, a displacement mapping 315 step, and a ray traversal and surface intersection 320 step.

In the input 305 step, the scene rendering system 110 access a triangle mesh surface model 103 that models a surface of a 3D object and a displacement texture map 102 that models a texture of one or more regions of the surface of the 3D object. Further details concerning the input 305 step of FIG. 3 are described in block 410 of FIG. 4. In the pre-processing 310 step, the scene rendering system 110 pre-processes the displacement texture map 102 into an RMIP data structure 104 that stores minmax displacement bounds over rectangular regions in a texture space. Further details concerning the pre-processing step 310 of FIG. 3 are described in block 420 of FIG. 4. In the displacement mapping 315 step, the scene rendering system 110 computes a tight bounding prism for the displaced surface within each base triangle based on a mapping of the RMIP data structure 104 to the triangle mesh surface model 103. The scene rendering system 110, in some instances, maps the RMIP data structure 104 to the triangle mesh model 10 based on displacement parameters 301. Example displacement parameters 301 include a scale parameter, an offset parameter, and tiling parameter. For example, the scale parameter represents how steep the displacement content is and the offset parameter comprises an additive factor. The tiling parameter impacts how the 2D texture of the displacement map is mapped to the triangle mesh model 10. For example, if the displacement texture map includes a single peak, then increasing the tiling parameter may map multiple peaks onto the triangle mesh model 10. During the displacement mapping 315 step, the scene rendering system 110 organizes the generated displaced surface bounding prisms 106 into a static bounding volume hierarchy. Further details concerning the displacement mapping 315 step of FIG. 3 are described in block 430 of FIG. 4.

At the ray traversal and surface intersection 320 step, any intersection of a ray with a displaced surface bounding prism 106 triggers the iterative bound reduction process, which alternates between bound reductions processes 115A and 115B in 2D texture space and 3D object space to tighten the interval of potential intersection in a hierarchical fashion. For example, step 320 illustrates how the scene rendering system 110 determines an intersection of the ray with the surface texture of the 3D object 101 when the ray intersects a displaced surface bounding prism 106. FIG. 3 depicts three iterations of the iterative bound reduction processes. Each of the 3D object space and the 2D texture space includes unique information that is leveraged to tighten the bound in the other space. Subdividing the region in 2D texture space yields tighter scalar displacement bounds and thus tighter 3D object space bounds. Also, intersecting those 3D bounds then tightens the valid ray interval and reduces the 2D texture space bounds. Once the 2D texture space bounds are reduced to be smaller than threshold dimensions, the scene rendering system 110 performs a texel marching 325 process on the reduced texture space bound 117 to determine a point of intersection 118 of the ray. In some instances, the image rendering subsystem 114 uses affine arithmetic to map the subdivided texture space bounds 117 to corresponding 3D object space bounds 116 in 3D object space and uses displacement inversion techniques to map 3D bounds to 2D texture space bounds.

The texel marching 325 process generates a tessellated reduced texture space bound 118, generating and intersecting micro-geometry on-the-fly along the ray. Further details concerning the ray traversal and surface intersection 320 step of FIG. 3 are described in block 440 of FIG. 4 and in FIG. 5.

FIG. 4 depicts a method 400 for rendering via ray tracing, using an RMIP data structure 104 and an iterative bound reduction process 115, a 2D image 105 of a scene including a 3D object 101 with a textured surface, according to certain embodiments disclosed herein. One or more computing devices (e.g., the scene rendering system 110 or the individual subsystems contained therein) implement operations depicted in FIG. 4. For illustrative purposes, the method 400 is described with reference to certain examples depicted in the figures. Other implementations, however, are possible.

At block 410, the method 400 involves accessing, by the scene rendering system 110, a triangle mesh surface model 103 representing a surface of a 3D virtual object 101 within a virtual scene and a 2D displacement texture map 102 defining a texture for the surface of the 3D virtual object 101. The 3D object 101 may include defined dimensions, contours, or other information which defines the 3D object 101 within the 3D virtual scene. For example, the scene rendering system 110 accesses the triangle mesh surface model 103 and the displacement texture map 102 from a data storage unit 111. In some instances, a single displacement texture map 102 defines a texture for an entirety of the surface area of the 3D object 101. In some instances, the multiple displacement texture maps 102 define respective reliefs (e.g., textures) for the surface area of the 3D virtual object. For example, a first displacement texture map 102 defines a first texture for a first region of the surface area, a second displacement texture map 102 defines a second texture for a second region of the surface area, and so forth. FIG. 2 provides an example of using multiple displacement texture maps 102 to model textures for various regions of a triangle mesh surface model 103. In some instances, scene rendering system can receive inputs from a user via a user interface 123 of a user computing device 120 selecting a 3D object 101 and a texture for the surface of the 3D object 101 and retrieve the triangle mesh surface model 103 representing a surface of the selected 3D object 101 and the displacement texture map 102 corresponding to the selected texture responsive to receiving the inputs.

At block 420, the method 400 involves generating, by the scene rendering system 110 based on the 2D displacement texture map 102, a displacement bounds data structure that defines displacement bounds over one or more regions in a texture space. The displacement bounds structure defines displacement bounds over one or more regions in a texture space. For example, the 2D displacement texture map 102 represents the texture space. For example, the 2D displacement texture map 102 defines, for each section (e.g., square block shaped section) of the map, a displacement value representing a height or depth of displacement of the area from the level surface to form the texture corresponding to the map. In certain embodiments, the regions of the displacement bounds data structure comprise rectangular regions. For example, the displacement bounds data structure, in certain examples, comprises a rectangular minmax image pyramid ("RMIP") data structure 104. The RMIP data structure 104 stores displacement bounds over rectangles of various size and shape in the texture space. In certain examples, the RMIP data structure 104 defines a minimum displacement bound for one or more rectangular regions in the texture space. In certain examples, the RMIP data structure 104 defines, for the one or more rectangular regions in the texture space, a maximum displacement bound. In certain examples, the RMIP data structure 104 defines, for the one or more rectangular regions in the texture space, both a minimum displacement bound and a maximum displacement bound. Further details concerning how to generate the displacement bounds structure are described in FIGS. 9-11 herein and an illustration of an example of an RMIP data structure 104 generated using the methods described herein is illustrated in FIG. 11. In certain embodiments, the scene rendering system 110 can define a minimum and/or a maximum displacement bound for regions of various shapes (e.g., including nonrectangular shaped regions) in the displacement bounds data structure.

At block 430, the method 400 involves generating, by the scene rendering system 110 based on the triangle mesh surface model 103 and the displacement bounds data structure, a displaced triangle mesh model comprising a plurality of displaced surface bounding prisms 106, each displaced surface bounding prism 106 displacing a respective base triangle of the triangle mesh surface model 103 by a minimum and/or maximum height defined by the displacement bounds data structure. The scene rendering system 110 generates the displaced triangle mesh model based on the triangle mesh surface model 103 and the displacement bounds data structure (e.g., RMIP data structure 104). Each displaced surface bounding prism 106 is displaced from its respective base triangle on the triangle mesh surface model 103 at a minimum height and/or a maximum height defined by the displacement bounds data structure. FIG. 3 illustrates, among other features, an example of displaced bounding prisms.

Generating the displaced triangle mesh model that includes displaced surface bounding prisms that are displaced according to displacement bounds defined in the RMIP data structure 104 for the respective texture space area corresponding to the location of the respective base triangle provides a good compromise between intersection complexity and tightness, especially since the it achieves space subdivision, i.e., the displaced-surface bounds of neighboring triangles do not overlap in the 3D object space. An even more important advantage of using prisms over axis-aligned 3D boxes is the guarantee that every 3D location inside the displaced surface bounding prisms 106 can be successfully projected to 2D texture space.

In certain embodiments, each displaced surface bounding prism 106 is made of two triangles and three bilinear patches. The triangles are computed by offsetting the base triangle along the vertex normals. Intersections, including the ray starting point if inside the prism, are first sorted front to back, then grouped by pairs to form non overlapping intervals in 3D, that are finally projected into texture space to form the initial 2D bounds stack. The scene rendering system 110 can construct the displaced surface bounding prism 106 as a collection of triangles, offsetting the base triangle $\mathcal{T}$ along its three vertex normals at a distance $s \in [s_{min}, s_{max}]$. This prism corresponds to the set $\{P(u,v)+sN(u,v), (u,v) \in \mathcal{T}, s \in [s_{min}, s_{max}]\}$, which fully contains the displaced surface when $$s_{min} = \min_{\mathcal{T}} \frac{h(u,v)}{|N(u,v)|} \geq \min\left(\frac{\min_{\mathcal{T}} h(u,v)}{\min_{\mathcal{T}} |N(u,v)|}, \frac{\min_{\mathcal{T}} h(u,v)}{\max_{\mathcal{T}} |N(u,v)|}\right) \quad (1)$$

and $$s_{max} = \max_{\mathcal{T}} \frac{h(u,v)}{|N(u,v)|} \geq \max\left(\frac{\min_{\mathcal{T}} h(u,v)}{\min_{\mathcal{T}} |N(u,v)|}, \frac{\max_{\mathcal{T}} h(u,v)}{\max_{\mathcal{T}} |N(u,v)|}\right) \quad (2)$$

The displaced surface bounding prism 106 can therefore be obtained by computing displacement bounds and interpolated normal norm bounds over the base triangle. The displacement bounds can be obtained for example using the RMIP data structure 104 with a 2D bounding box of the base triangle in texture space, or using a minmax mipmap. For the interpolated normal, assuming the three vertex normals $n_i$ are normalized, the optimal upper bound is $\max_{\mathcal{T}} |N(u,v)|=1$. For the lower bound, the scene rendering system 110 can minimize the following function:

$$\min_{u,v \in \mathcal{T}} |N(u,v)|^2 = \min_{u,v \in \mathcal{T}} |un_1 + vn_2 + (1-u-v)n_3|^2 \quad (3)$$

Since $\mathcal{T}$ is compact and $|N|^2$ is $C^1$, $|N|^2$ has a minimum on T that is either reached on the interior of $\mathcal{T}$ where $J_{|N|^2}=0$, or on the boundary of $\mathcal{T}$. Computing the Jacobian gives:

$$J_{|N|^2}(u_0, v_0) = 0 \Leftrightarrow \text{Gramian}(n_1-n_3, n_2-n_3)\begin{bmatrix} u_0 \\ v_0 \end{bmatrix} = -\begin{bmatrix} n_3 \cdot (n_1-n_3) \\ n_3 \cdot (n_2-n_3) \end{bmatrix} \quad (4)$$

If $(n_1-n_3) \times (n_2-n_3) \neq 0$, Gramian$(n_1-n_3, n_2-n_3)$ is positive-definite and Equation (4) can be solved and if the solution $(u_0, v_0)$ is inside $\mathcal{T}$, the lower bound is $\min_{\mathcal{T}} |N(u,v)|=|N(u,v)|$. Otherwise, the minimum is on the triangle boundary as:

$$\min_{u,v \in \mathcal{T}} |N(u,v)|^2 = \min_{i \neq j} \min_{0 \leq \lambda \leq 1} |(1-\lambda)n_i + \lambda n_j|^2 \quad (5)$$

$$= \min_{i \neq j} |(1/2)(n_i + n_j)|^2 \quad (6)$$

$$= \frac{1}{2}(1 + \min(n_1 \cdot n_2, n_1 \cdot n_3, n_2 \cdot n_3)). \quad (7)$$

At block 440, the method 400 involves determining, by the scene rendering system 110, a pixel value for each pixel of a 2D image of the virtual scene by performing a ray tracing process using the displaced triangle mesh model, wherein the tray tracing process includes performing an iterative bounds reduction process when a ray intersects a displacement surface bounding prism of the displaced triangle mesh model. The ray tracing process involves performing an iterative bound reduction process 115 when a ray intersects a displaced surface bounding prism 106 of the displaced triangle mesh model. The iterative bound reduction process 115 involves determining an initial 3D object space bound 116 in 3D space and, from the initial 3D object space bound 116, an initial 2D rectangular bound in a texture space defined by the displacement texture map 102. For example, the initial 3D object space bound 116 is the intersected displaced surface bounding prism. The iterative bound reduction process 115 also includes determining intersection endpoints of the ray on the 3D object space bound 116 and projecting the endpoints to the texture space to define a reduced texture space bound 117 for the ray. The reduced 2D rectangular bound is tighter than the initial 2D texture space bound 117. Further details about the iterative traversal process are described in FIG. 5 and FIG. 6. The iterative traversal process is repeated until the reduced texture space bound 117 is less than threshold dimensions and then the scene rendering system 110 performs a texel marching process on the reduced texture space bound 117. The texel marching process involves a direct intersection test with a local reconstruction of the displaced surface. In certain embodiments, the threshold dimensions can be varied. In some instances, the threshold dimensions are larger than dimensions of a texel. Performing the texel marching process on the reduced 2D texture space bound 116 results in determining an intersection 118 of the ray at the 2D texture space. The scene rendering system 110 determines a color value for the ray associated with the pixel of the 2D image based on the determined point of intersection 118.

At block 450, the method 400 involves displaying, by the scene rendering system 110 via a user interface 123, the 2D image 105 of the virtual scene with the pixel values determined using the ray tracing process. For example, the scene rendering system 110 determines a color value for each pixel of the 2D image 105 using the ray marching process and the displaced triangle mesh model. As explained previously, this ray marching process includes, when a ray intersects a bounding prism of the displaced triangle mesh model, performing the iterative bound reduction process and the texel marching process on the reduced 2D bound generated via the iterative bound reduction process. In certain embodiments, when a ray does not intersect a bounding prism, the scene rendering system 110 determines that the ray does not intersect with the surface of the 3D object 101 and does not perform the iterative bound reduction process 115 described herein.

Figure 5:
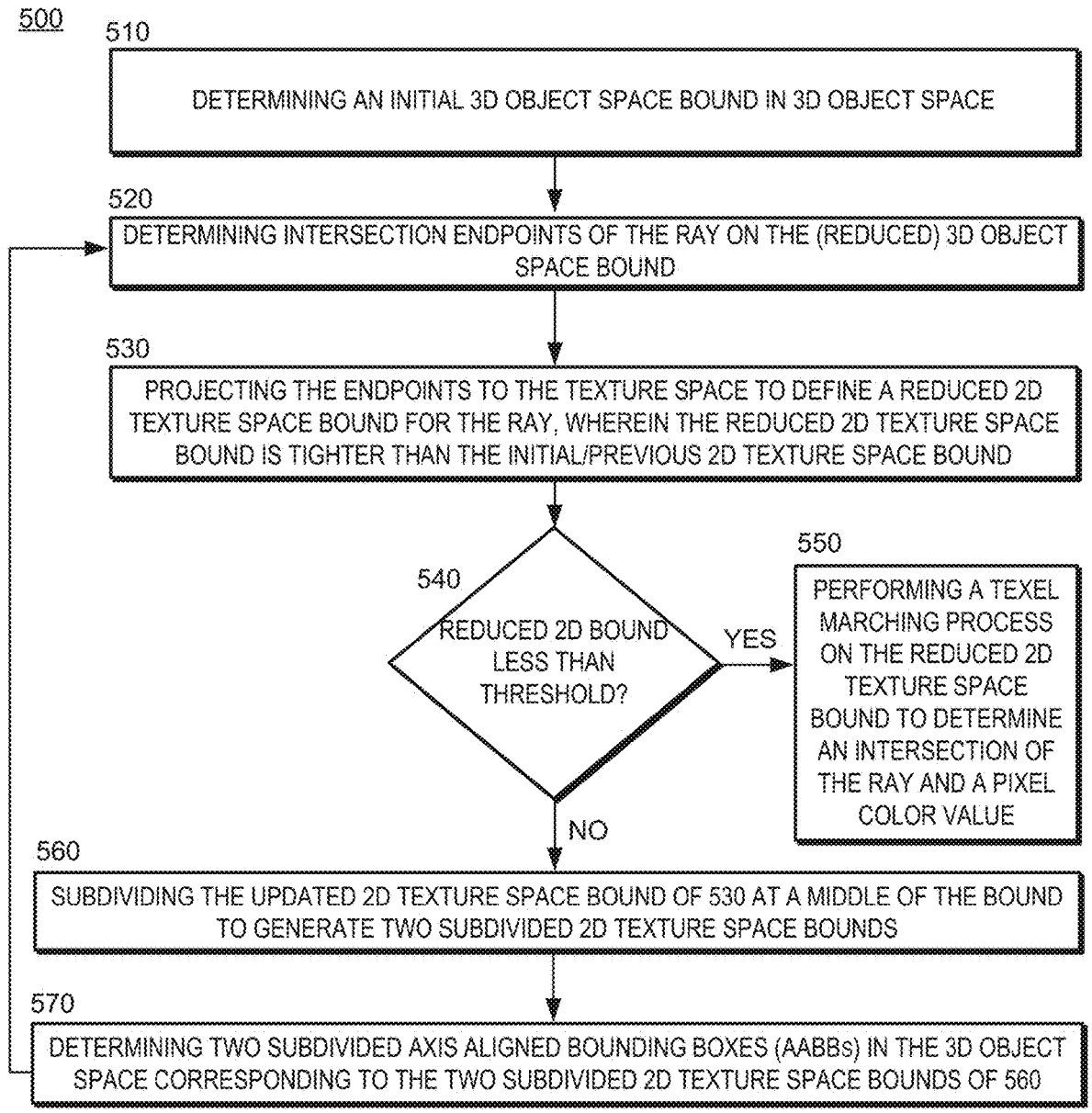
FIG. 5 depicts a method for performing an iterative bound reduction process that can be used with the method described in FIG. 4, according to certain embodiments described herein.

FIG. 5 depicts a method 500 for a method for performing an iterative bound reduction process 115 that can be used with the method described in FIG. 4, according to certain embodiments described herein. One or more computing devices (e.g., the scene rendering system 110 or the individual subsystems contained therein) implement operations depicted in FIG. 5. For illustrative purposes, the method 500 is described with reference to certain examples depicted in the figures. Other implementations, however, are possible.

During ray tracing, for every pixel of a 2D image 105 to be rendered of the scene, a ray is projected into the scene that includes the displaced triangle mesh model. Any time a ray intersects a displaced surface bounding prism 106 of the displaced triangle mesh model, the scene rendering system 110 performs the iterative bound reduction process 115 (e.g., traversal algorithm). First, the scene rendering system 110 projects the ray-prism intersection interval to texture space. For example, the ray-prism intersection interval is the path that the ray takes through the intersected bounding prism starting from a first endpoint where the ray enters the bounding prism to a second endpoint where the ray exits the bounding prism. The projection of the ray from 3D space to texture space comprises a curve which may need to be split into sub-curves so that each can be bounded by the axis-aligned rectangle spanned by its endpoints. In some instances, the bounding rectangles are pushed to a stack and a traversal loop process then retrieves rectangular bounds from the stack and alternates between (1) computing 3D-surface bounds from displacement bounds over rectangles and intersecting them and (2) projecting the 3D intersection intervals and subdividing the rectangles that bound them. (see FIG. 3). When the 2D bound becomes smaller than a threshold size, the scene rendering system 110 performs a texel marching process, marching the ray along the displacement texels it spans, reconstructing and testing the displaced 3D surface for intersections for each texel locally. Because the texel marching process is performed in a front-to-back manner along the ray, the scene rendering system 110 can terminate the texel marching process as soon as the scene rendering system 110 identifies an intersection 118 of the ray with the 2D surface.

At block 510, the method 500 involves determining, by the image rendering subsystem 114, an initial 3D object space bound 116 in 3D object 101 space. For example, the initial 3D object space bound 116 is the displaced surface bounding prism 106 intersected by a ray.

At block 520, the method 500 involves determining, by the image rendering subsystem 114, intersection endpoints of the ray on the 3D object space bound 116 of block 510. For example, the image rendering subsystem determines where the ray enters the displaced surface bounding prism 106 and where the ray exits the displaced surface bounding prism 106.

At block 530, the method 500 involves projecting, by the image rendering subsystem 114, the endpoints to the texture space to define a reduced 2D texture space bound 117 for the ray, wherein the reduced 2D texture space bound 117 is tighter than the previous 2D texture space bound 117. The rectangle spanned by these projections will bound the 2D interval curve if the curve's partial derivatives with respect to u and u are non-zero, in other words, if the curve does not change its principal direction inside the rectangle. The image rendering subsystem 114 can identify such "turning" points and subdivide the curved interval into sub-intervals with non-zero derivatives that can each be easily rectangle-bounded. For a triangle with linearly interpolated position P(u,v) and normal N(u,v) at texture space coordinates uv, for a ray with origin O and direction D, the projected ray has a simple implicit form enabling retrieval of those points using closed-form computations:

$$\psi(u, v) = \det(P(u, v) - O, N(u, v), D) = 0 \tag{8}$$

Equation (8) is a quadratic in the texture space with the following partial derivatives:

$$\begin{bmatrix} \psi_u \\ \psi_v \end{bmatrix} = \begin{bmatrix} \det(P_u, N(u, v), D) + \det(P(u, v) - O, N_u, D) \\ \det(P_v, N(u, v), D) + \det(P(u, v) - O, N_v, D) \end{bmatrix}, \tag{9}$$

where $P_u$, $P_v$, $N_u$, $N_v$ are the partial derivatives of the interpolated base position and normal, which are all constant inside a base triangle. Each $\psi_u=0$ and $\psi_v=0$ defines a line in texture space. The image rendering subsystem 114 can retrieve the zero-derivative points by intersecting the projected ray with those two lines, by solving the two quadratic equations. This yields at most four such points, meaning at most four subdivisions of the initial interval.

In some instances, the image rendering subsystem 114 inverts the displacement for the intersection-interval endpoints to yield a new 2D ray bound 117 that is tighter than the initial one, sometimes drastically. Rays with directions near-parallel to directions of displacement have 2D projections smaller than the size of a texel. Traversal time complexity is thus constant for such rays as they can be directly tested against the displaced surface within that texel. In some instances, the bound tightening via interval projection is beneficial only for some rays.

At block 540, the method 500 involves determining, by the image rendering subsystem 114, whether the reduced 2D texture space bound 117 determined at block 530 is less than a threshold size. In some instances, the threshold size is larger than a texel. Various reasons exist for setting the threshold size larger than the size of a texel. Firstly, the 2D texture space bounds 117 are arbitrary rectangles that are not aligned with the texels of the displacement texture map 102. That is, a texel is typically covered by different 2D regions, which leads to redundancy in the direct intersection tests. Texel marching amortizes this redundancy. Secondly, the linear-memory-footprint variant of the RMIP data structure 104 has a smaller resolution than the input texture displacement map 102. Once the 2D texture space bounds 117 become smaller than the RMIP data structure 104 resolution, the scalar displacement bounds returned by RMIP stop getting tighter. Texel marching enables the image rendering subsystem 114 to avoid querying the RMIP data structure 104 below this threshold size.

Figure 6:
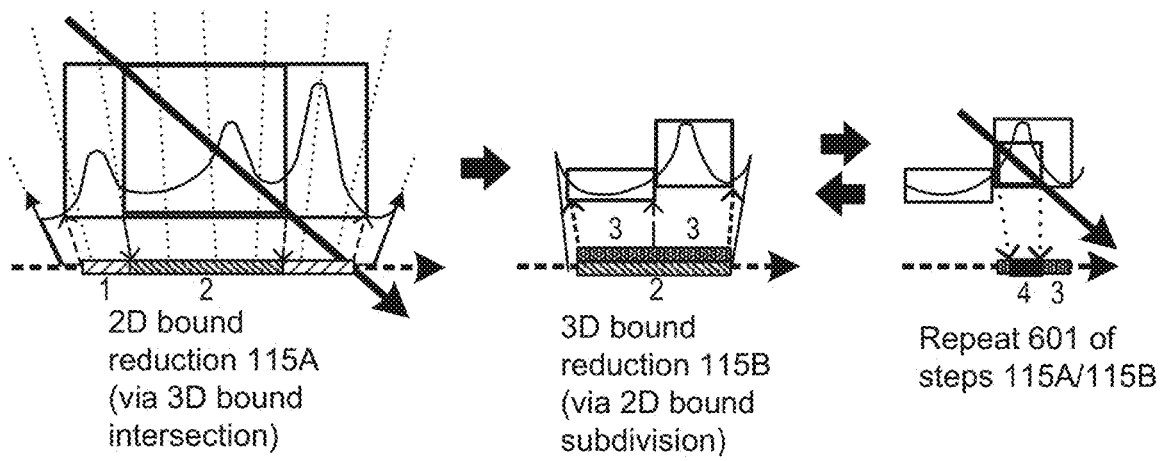
FIG. 6 illustrates an example of the iterative bound reduction process described in FIG. 5, according to certain embodiments described herein.

If the reduced 2D texture space bound 117 is greater than the threshold size, the method 500 proceeds to block 560. For example, after performing the 2D bound reduction 115A process, the resulting texture space bound 117 is still larger than the threshold size, therefore, the image rendering subsystem 114 will perform a subsequent iteration of both the 3D bound reduction 115B process and the 2D bound reduction 115A process. An example of performing multiple iterations of the complementary bound reduction processes 115A and 115B is illustrated in FIG. 6.

Figure 7:
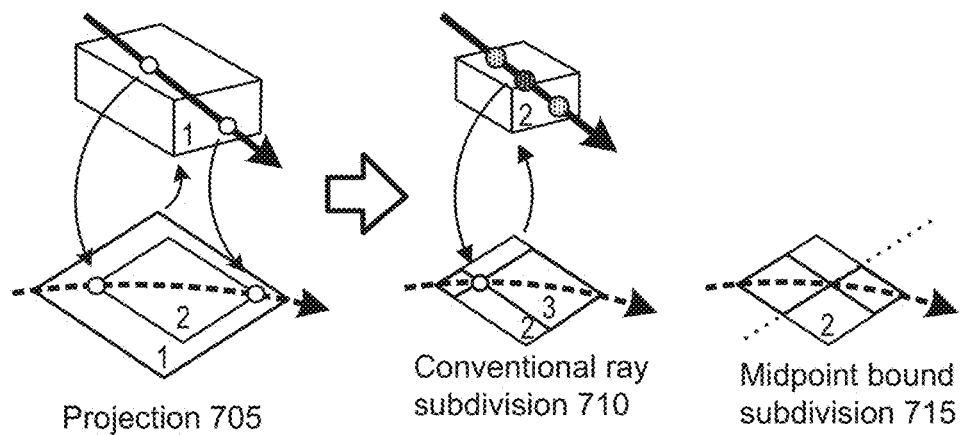
FIG. 7 illustrates an example of the iterative bound reduction process described in FIG. 5 compared to a conventional bound reduction process, according to certain embodiments described herein.

At block 560, the method 500 involves subdividing, by the image rendering subsystem 114, the reduced 2D texture space bound 117 of block 540 at a middle of the 2D texture space bound 117 generate two subdivided 2D texture space bounds. Using explicit subdivision guarantees that bounds eventually reach a size small enough for direct intersection. The image rendering subsystem 114 splits the domain directly in texture space, using the implicit form to compute the intersection between the interval curve and the line that splits the longer side of the bound in the middle. This subdivision scheme automatically culls half the area of the bound and puts a strict upper bound on the number of traversal steps. An example of subdividing the texture space bound 117 at a middle of the texture space bound is illustrated in FIG. 7.

At block 570, the method 500 involves determining, by the image rendering subsystem 114, two subdivided axis aligned bounding boxes (AABBs) in the 3D object space corresponding to the two subdivided 2D texture space bounds of block 560. In some instances, the image rendering subsystem 114 uses affine arithmetic to map the subdivided texture space bounds 117 to corresponding subdivided 3D object bounds 116 (e.g., the two subdivided AABBs) in 3D object space.

From block 570, the method 500 returns to block 520. For example, at block 520, the image rendering subsystem 114 determines intersection endpoints of the ray on the reduced 3D object space bound (for each of the two subdivided AABBs intersected by the ray) and, at block 530, projects the endpoints of the subdivided AABB, of the two subdivided AABBs, that is first intersected by the ray to the 2D texture space to define a reduced texture space bound 117 that is tighter than the initial texture space bound determined at the previous iteration of block 530. Next, the image rendering subsystem 114 determines whether the reduced texture space bound 117 is tighter than the threshold size. Accordingly, blocks 520, 530, 540, 560, 570, and 580 are repeated, as applicable, until the image rendering subsystem 114 determines, at a subsequent iteration of block 540, that a reduced 2D texture space bound 117 is less than the threshold size and then the method 500 proceeds to block 550.

Returning to block 540, if the reduced 2D texture space bound 117 is less than or equal to the threshold size, the method 500 proceeds to block 550.

The following is an example pseudo-code of a displacement intersection algorithm that can be used to perform the above-mentioned steps of method 500:

```
1:   function INTERSECTRMIP(ray, triangle, prism, rmip)
2:      points = sort(intersect(ray, prism))
3:      bounds = inverse displacement (points, triangle)
4:      turning points = zero uv derivative (ray, triangle)
5:      bounds = split (bounds, turning points)
6:      while bounds is not empty do
7:         bound = bounds.pop( )
8:         if bound is smaller than marching scale then
9:            For texel in texel marching (bound) do
10:              if hit = displaced surface intersect (ray, texel) then
11:                 return hit
12:           box = surface bounds (triangle, bound, rmip)
13:           if not hits = intersect (ray, box) then
14:              continue
15:           bound = reduce (bound, hits)
16:           for front, back in split (bound) do
17:              bounds.push (back, front)
```

The algorithm represented by this example pseudo-code iteratively tightens ray bounds in both 2D texture space and 3D object space, leveraging the RMIP data structure.

At block 550, the method 500 involves performing a texel marching process on the reduced 2D texture space bound 117 to determine an intersection 118 of the ray and a pixel color value 119 for the ray. Further details describing the texel marching process are described in FIG. 8 herein.

FIG. 6 illustrates an example 600 of the iterative bound reduction process 115 described in FIG. 5, according to certain embodiments described herein. As depicted in FIG. 6, the iterative bound reduction process includes a 2D bound reduction process 115A, a 3D bound reduction process 115A, and a repeat 601 of the bound reduction processes 115A and 115B until the reduced 2D texture space bound 117 is less than or equal to a threshold size. As illustrated in the 2D bound reduction process 115A, for a given initial bound (e.g., label number 1) in the 2D displacement texture space, the scene rendering system 110 computes displacement bounds to obtain a 3D bound around the displaced surface. Projecting the ray-bound intersection interval back into the 2D texture space yields a reduced 2D texture space bound 117 (e.g., label number 2). As illustrated in the 3D bound reduction process 115B, the reduced 2D texture space bound 117 (e.g., label number 2) is then subdivided into two subregions (e.g., the two subregions each having label number 3) which, in turn, yield tighter bounds in 3D object space in the form of two subdivided AABBs. As illustrated in the repeat 601 step of FIG. 6, the ray interval of the first intersected 3D subdivided AABB is projected back into the 2D texture space (e.g. as in 2D bound reduction process 115A) and the process repeats by feeding the obtained tighter 2D texture space bound 117 (e.g. label number 4) into the 3D bound reduction process 115B.

FIG. 7 illustrates an example 700 of the iterative bound reduction process 115 described in FIG. 5 compared to a conventional bound reduction process, according to certain embodiments described herein. As depicted in FIG. 7, the scene rendering system 110 narrows down a search for a ray's intersection to the surface of the 3D object 101 by tightening its 2D bound via 2D bound reduction 115A process and 3D bound reduction 115B process. The 2D bound reduction 115A involves, as illustrated in the projection 705 step illustrated in FIG. 7, projecting the endpoints of the 3D-bound intersection interval (e.g., the path of the ray) to 2D texture space to yield a tighter 2D texture space bound 117. A conventional approach for 3D bound reduction 115B involves, as illustrated in the conventional ray subdivision 710 step illustrated in FIG. 7, projecting the 3D bound intersection interval's midpoint into the 2D texture space. However, as illustrated in FIG. 7, the conventional ray subdivision 710 step results in an unbalanced traversal and suboptimal space culling. Instead, the methods described herein perform the midpoint bound subdivision 715 step illustrated in FIG. 7 splits the 2D texture space bound at its midpoint which provides advantages including a faster processing, a culling/excluding of a greater bound area, a more balanced traversal, and a reduction of a number of traversal steps compared to processing the conventional ray subdivision 710 step.

Figure 8:
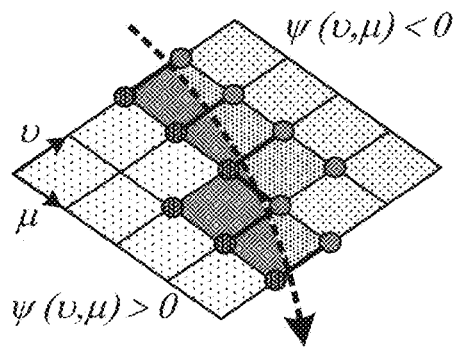
FIG. 8 illustrates a texel marching process on a reduced 2D texture bound for use in the iterative bound reduction process described in FIG. 5, according to certain embodiments described herein.

FIG. 8 illustrates a texel marching process on a reduced 2D texture bound for use in the iterative bound reduction process described in FIG. 5, according to certain embodiments described herein. The final stage of determining, during ray tracing, where the ray intersects the textured 3D object 101 surface is a texel marching process, which is performed when the reduced 2D texture space bound 117 (e.g., generated via the iterative bound reduction process 115) is less than a threshold size. The texel marching process includes a directed intersection 118 test with a local reconstruction of the displaced surface. As illustrated in FIG. 8, the ray is marched through the texels it crosses and the sign of the implicit form $\psi(3)$ at each texel corner indicates from which edge the ray leaves the texel. Texels correspond to pixels of the texture displacement map and the texel corner values are used for determining the pixel of the texture displacement map that overlaps the cured ray in texture space. In some instances, based on the determined intersection 118, the scene rendering system 118 determines a color response (e.g., color value 119) for a pixel of a 2D image 105 associated with the intersecting ray.

FIG. 9 depicts a method for generating an RMIP data structure 104 that can be used with the method described in FIG. 4, according to certain embodiments described herein. One or more computing devices (e.g., the scene rendering system 110 or the individual subsystems contained therein) implement operations depicted in FIG. 9. For illustrative purposes, the method 900 is described with reference to certain examples depicted in the figures. Other implementations, however, are possible.

At block 910, the method 900 involves computing minmax values over pixel blocks of a displacement texture map 102. The RMIP generator subsystem 112, in some instances, pre-computes the minmax values for sub-queries of a set of 2D range queries. For example, any 2D range query can be decomposed into four sub-queries, possibly overlapping, whose side lengths are powers of two. Such a query is specified by its side length $(2^p, 2^q)$, with $0 \leq p, q \leq \log_2 N$, and the position of its top left corner $(x,y)$, with $0 \leq x \leq N-2^p$ and $0 \leq y \leq N-2^q$. In some instances, the RMIP generator subsystem 112 determines that the displacement texture map 102 is square with a power-of-two side N. The RMIP generator subsystem determines a precomputed minmax query $H_{x,y}^{p,q}$ with size $(2^p, 2^q)$ and position $(x,y)$. The query for a rectangle with non-power-of-two size $(w,h)$ and top-left position $(x,y)$ is the minmax of four H values:

$$RMQ(x, y, w, h) = \text{minmax}\left(H_{x,y}^{p,q}, H_{m_x,y}^{p,q}, H_{m_x,m_y}^{p,q}, H_{x,m_y}^{p,q}\right) \quad (10)$$

In Equation (10), $(p,q) = \lfloor \log_2 w, h \rfloor$ and $(m_x, m_y) = (x+y) + (w,h) - (2^p, 2^q)$. The number of possible query sizes is $(1+\log_x N)^2$ with $N^2$ possible positions and, therefore, a total of $N^2(1+\log_2 N)^2$ minmax H values. The scene rendering system 110 assembles the values for each query size $(p,q)$ into a 2D grid, at power-of-two scales. An illustration of computing minmax queries is provided in FIG. 10. An illustration of an example RMIP data structure 104 is provided in FIG. 11. The following is an example of pseudo-code representing an algorithm that can be used to compute queries for determining minmax values:

```
1:   function RMIP_RMQ(u υ_min, u υ_max, λ, rmip)
2:      r = textureSize (rmip, 0)
3:      p_min = [u υ_min · r], p_max = [u υ_max · r]
4:      s = [log_2(p_max - p_min))]
5:      i = s.x + s.y · rmip array stride
6:      u υ_min = (p_min + 0.5) / r
7:      (u υ_min = (p_min + 0.5 - 2^s) / r
8:      b_1 = textureLoD(rmip, u_min, υ_min, i, λ)
9:      b_2 = textureLoD(rmip, u_mid, υ_min, i, λ)
10:     b_3 = textureLoD(rmip, u_min, υ_mid, i, λ)
11:     b_4 = textureLoD(rmip, u_mid, υ_mid, i, λ)
12:        return minmax (b_1, b_2, b_3, b_4)
```

This example pseudo-code provides a range minmax query (RMQ) using the RMIP data structure, for a given u v rectangle and a level of detail LoD λ. In some instances, the level of detail is fractional. At line 2 of the pseudo-code, the RMIP resolution is determined at LoD=0. At line 3, the query pixel corners are defined. At line 4, the query log size is defined in pixels. Line 5 provides an RMIP array layer index. Line 6 adjusts to the pixel center. Line 7 defines a top right of a bottom left subquery. Lines 8, 9, 10, and 11 include top left, top right, bottom left, and bottom right subqueries, respectively.

In some instances, the RMIP generator subsystem 112 bounds continuously interpolated displacement signals, tiled over a uv plane, and generates an RMIP data structure 104 having fractional level of detail (LoD) support. Further, the RMIP generator subsystem 112 addresses queries that wrap around the 2D texture by pre-computing additional queries. For example, the $H_{x,y}^{p,q}$ values with $N-2^p \leq x \leq N$ and/or $N-2^q \leq y \leq N$ which were left empty so far as the corresponding rectangle was crossing the grid boundaries, can be computed assuming a repeating texture. Further, in some instances, the RMIP generator subsystem 112 computes an RMIP data structure 104 independently for each of a set of input mipmap levels (e.g., levels of detail—LoD). Because the number of array layers is $(1+\log_2 N)^2$, each mip level has a different layer count, which is not suitable for sampling fractional LoD using the hardware. Therefore, the RMIP generator subsystem 112 fills the whole mip hierarchy by carefully copying layers within the same mip layer, in a way that the mipmap region associated to an uv plane at the LoD k is always a subset of the minmax region for the same uv plane at the LoD k+1. The following is an example algorithm that can be used to At block 920, the method 900 involves computing non-wrapping queries iteratively by combining bounds along one dimension at a time. In some instances, the RMIP generator subsystem 112 computes non-wrapping queries on the assumption that a rectangle with a power-of-two size can be decomposed into two smaller non-overlapping sub rectangles with also a power-of-two size.

At block 930, the method 900 involves computing wrapping queries by decomposing the wrapping queries in up to four non-wrapping subqueries determined at block 520 and splitting the wrapping query at a texture boundary. As these determined subqueries at block 930 do not have a power-of-two size, they are computed on the fly using already precomputed RMIP entries from block 920.

At block 940, the method 900 involves generating an RMIP data structure 104 based on the queries computed at block 520 and block 530, the RMIP data structure 104 defining displacement bounds for each of a set of rectangular regions of the 2D displacement texture map 102. In certain embodiments, the RMIP generator subsystem 112 reduces a memory requirement for storing the RMIP data structure 104 by downscaling the RMIP data structure's 104 resolution R such that its associated RMIP data structure 104 contains only $N^2$ values, which leads to the equation $R \cdot (1 + \log_2 R) = N$, the solution of which is $$R = \frac{1}{2} \exp(W_0(N \log 4)) \sim N / \log_2 N,$$

where $W_0$ is Lambert's W function's principal branch. In some instances, the RMIP generator subsystem 112 downscales the input displacement conservatively, computing minmax values over pixel blocks of size $$B = \frac{N}{R} \sim \log_2 N.$$

The following is an example pseudo-code providing an algorithm that can be used to compute the RMIP data structure 104 according to method 900:

```
1:   function COMPUTERMIP(h)
2:     H^{0,0} = blockwise minmax (h)
3:     for 0 ≤ q ≤ log₂ N do
4:       for 0 ≤ p < log₂ N, 0 ≤ y < N − 2^q, 0 ≤ x < N − 2^q do
5:         H_{x,y}^{p+1,q} = minmax(H_{x,y}^{p,q}, H_{x+2^p,y}^{p,q})
6:       if q < log₂ N then
7:         for 0 ≤ y < N − 2^q, 0 ≤ x < N do
8:           H_{x,y}^{0,q+1} = minmax(H_{x,y}^{0,q}, H_{x,y+2^q}^{0,q})
9:     for 0 ≤ q ≤ log₂ N, 0 ≤ p ≤ log₂ N do
10:      for 0 ≤ y < N, 0 ≤ x < N do
11:        if y₀ ≤ N − 2^q and x₀ ≤ N− 2^p then
12:          continue
13:        if x₀ + 2^p > N then
14:          w₀ = N − x₀, x₁ = 0, w₁ = x₀ + 2^p − N
15:        else
16:          x₁ = x₀, w₁ = w₀ = 2^p
17:        if y₀ + 2^q > N then
18:          y₁ = N, y₂ = 0, y₃ = y₃ − N
19:        else
20:          h₀ = N − y₀, y₁ = 0, h₁ = y₀ + 2^q − N
21:        b₁ = RMQ(x₀, y₀, w₀, h₀)
22:        b₂ = RMQ(x₁, y₀, w₁, h₀)
23:        b₃ = RMQ(x₀, y₁, w₀, h₁)
24:        b₄ = RMQ(x₁, y₁, w₁, h₁)
25:        H_{x,y}^{p,q} = minmax(b₁, b₂, b₃, b₄)
26:    return H
```

This example pseudo-code provides an RMIP pre-computation for one input displacement texture map h with resolution N×N. In this example pseudo-code, for convenience, the range min query function RMQ is defined to take as input the top left and bottom right positions of the query, instead of the top left position and size. In the example pseudo-code, at line 5, the bounds are merged along x and, at line 8, the bounds are merged along y. Lines 11-12 determine bounds that do not wrap around the texture displacement map. Line 13 determines the initial range for the query. Line 14 provides for splitting the x range into two non-wrapping x ranges or else, at line 16, duplicating the x range. Line 18 provides for splitting the y range into two non-wrapping y ranges or else, at line 20, duplicating the y range.

FIG. 10 depicts an example of computing minmax values for generation of an RMIP data structure, in accordance with certain embodiments described herein. The RMIP generator subsystem 112, in some instances, pre-computes the minmax values for sub-queries of a set of 2D range queries. For example, any 2D range query can be decomposed into four sub-queries, possibly overlapping, whose side lengths are powers of two. As depicted in FIG. 10, such a query is specified by its side length ($2^p$, $2^q$), with $0 \leq p$, $q \leq \log_2 N$, and the position of its top left corner (x,y), with $0 \leq x \leq N − 2^p$ and $0 \leq y \leq N − 2^q$. In some instances, the RMIP generator subsystem 112 determines that the displacement texture map 102 is square with a power-of-two side N. The RMIP generator subsystem determines a precomputed minmax query $H_{x,y}^{p,q}$ with size ($2^p$, $2^q$) and position (x,y). The query for a rectangle with non-power-of-two size (w,h) and top-left position (x,y) is the minmax of four H values according to Equation (1) discussed previously. The number of possible query sizes is $(1 + \log_x N)^2$ with $N^2$ possible positions and, therefore, a total of $N^2(1 + \log_2 N)^2$ minmax H values.

FIG. 11 depicts an example RMIP data structure 1100 (e.g., 104) that can be used with the method described in FIG. 4 and that can be generated according to the method described in FIG. 9, according to certain embodiments described herein. FIG. 10 depicts a memory layout of the RMIP data structure 1100 as a 2D texture with multiple layers and mip levels. Examples of precomputed queries are illustrated in the RMIP data structure 1100 with texels marked with a circle. Such precomputed queries comprise the minmax over the corresponding filled region. FIG. 11 illustrates precomputed queries inside of respective unit squares ("query region inside texture square") as well as regions cross the respective unit texture square ("query region wrapping around boundaries"). Layers with a lighter shading are copies of other layers within the same mip and make hardware sampling possible at a fractional level of detail (LoD).

Examples of Computing Environments for Implementing Certain Embodiments

Figure 12:
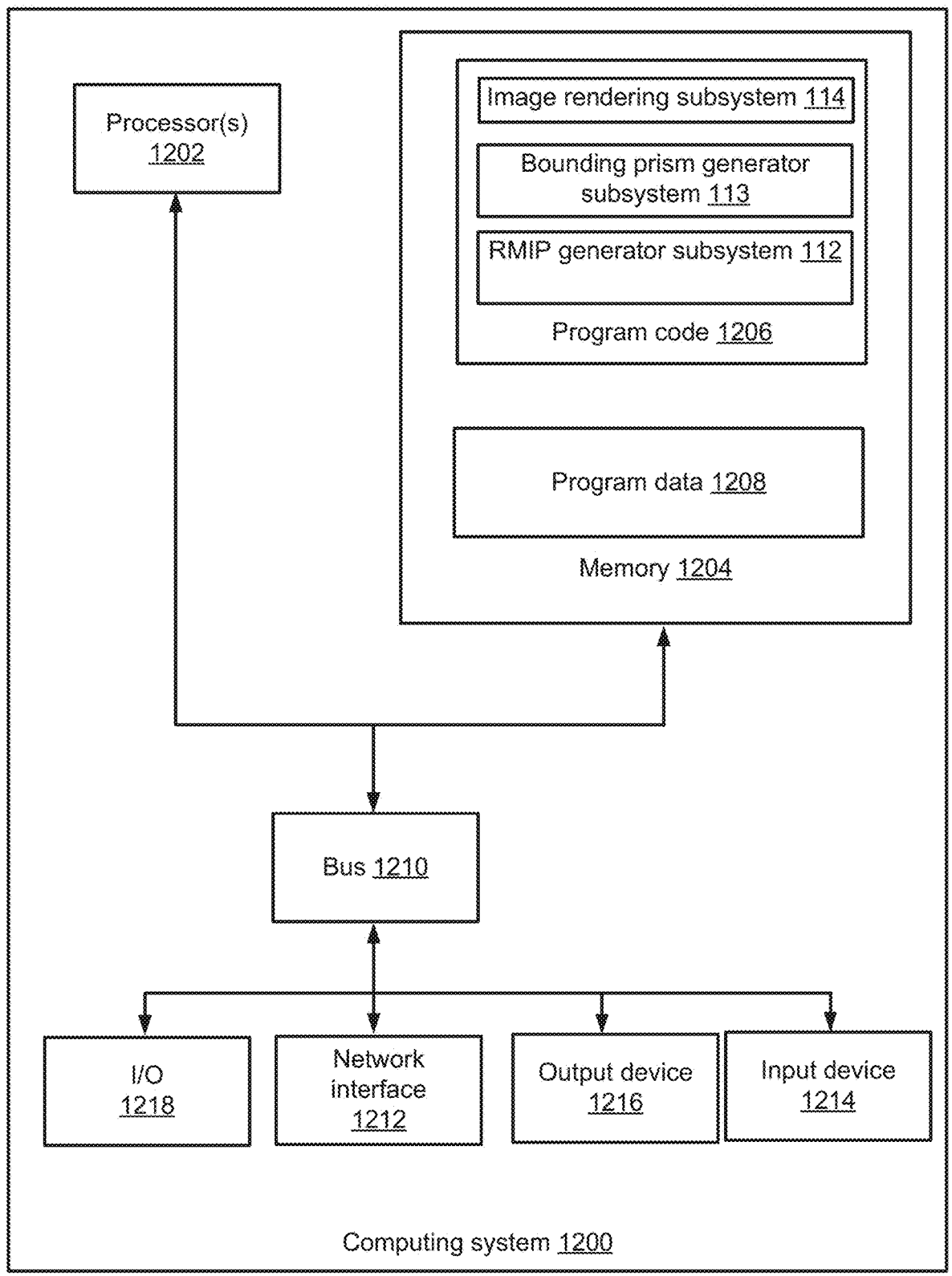
FIG. 12 depicts an example of a computing system that performs certain operations described herein, according to certain embodiments disclosed herein.

Any suitable computer system or group of computer systems can be used for performing the operations described herein. For example, FIG. 12 depicts an example of a computer system 1200. The depicted example of the computer system 1200 includes a processing device 1202 communicatively coupled to one or more memory components 1204. The processing device 1202 executes computer-executable program code stored in a memory components 1204, accesses information stored in the memory component 1204, or both. Execution of the computer-executable program code causes the processing device to perform the operations described herein. Examples of the processing device 1202 include a microprocessor, an application-specific integrated circuit ("ASIC"), a field-programmable gate array ("FPGA"), or any other suitable processing device. The processing device 1202 can include any number of processing devices, including a single processing device.

The memory components 1204 includes any suitable non-transitory computer-readable medium for storing program code 1206, program data 1208, or both. A computer-readable medium can include any electronic, optical, magnetic, or other storage device capable of providing a processing device with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory components 1204 can be volatile memory, non-volatile memory, or a combination thereof.

The computer system 1200 executes program code 1206 that configures the processing device 1202 to perform one or more of the operations described herein. Examples of the program code 1206 include, in various embodiments, the scene modeling system 110 (including the RMIP generator subsystem 112, the bounding prism generator subsystem 113, and the image rendering subsystem 114) of FIG. 1, which may include any other suitable systems or subsystems that perform one or more operations described herein (e.g., one or more neural networks, encoders, attention propagation subsystem and segmentation subsystem). The program code 1206 may be resident in the memory components 1204 or any suitable computer-readable medium and may be executed by the processing device 1202 or any other suitable processor.

The processing device 1202 is an integrated circuit device that can execute the program code 1206. The program code 1206 can be for executing an operating system, an application system or subsystem, or both. When executed by the processing device 1202, the instructions cause the processing device 1202 to perform operations of the program code 1206. When being executed by the processing device 1202, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory components 1204 store the program data 1208 that includes one or more datasets described herein. In some embodiments, one or more of data sets are stored in the same memory component (e.g., one of the memory components 1204). In additional or alternative embodiments, one or more of the programs, data sets, models, and functions described herein are stored in different memory components 1204 accessible via a data network. One or more buses 1210 are also included in the computer system 1200. The buses 1210 communicatively couple one or more components of a respective one of the computer system 1200.

In some embodiments, the computer system 1200 also includes a network interface device 1212. The network interface device 1212 includes any device or group of devices suitable for establishing a wired or wireless data connection to one or more data networks. Non-limiting examples of the network interface device 1212 include an Ethernet network adapter, a modem, and/or the like. The computer system 1200 is able to communicate with one or more other computing devices via a data network using the network interface device 1212.

The computer system 1200 may also include a number of external or internal devices, an input device 1214, a presentation device 1216, or other input or output devices. For example, the computer system 1200 is shown with one or more input/output ("I/O") interfaces 1218. An I/O interface 1218 can receive input from input devices or provide output to output devices. An input device 1214 can include any device or group of devices suitable for receiving visual, auditory, or other suitable input that controls or affects the operations of the processing device 1202. Non-limiting examples of the input device 1214 include a touchscreen, a mouse, a keyboard, a microphone, a separate mobile computing device, etc. A presentation device 1216 can include any device or group of devices suitable for providing visual, auditory, or other suitable sensory output. Non-limiting examples of the presentation device 1216 include a touchscreen, a monitor, a speaker, a separate mobile computing device, etc.

Although FIG. 12 depicts the input device 1214 and the presentation device 1216 as being local to the computer system 1200, other implementations are possible. For instance, in some embodiments, one or more of the input device 1214 and the presentation device 1216 can include a remote client-computing device that communicates with computing system 1200 via the network interface device 1212 using one or more data networks described herein.

Embodiments may comprise a computer program that embodies the functions described and illustrated herein, wherein the computer program is implemented in a computer system that comprises instructions stored in a machine-readable medium and a processing device that executes the instructions to perform applicable operations. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 13:
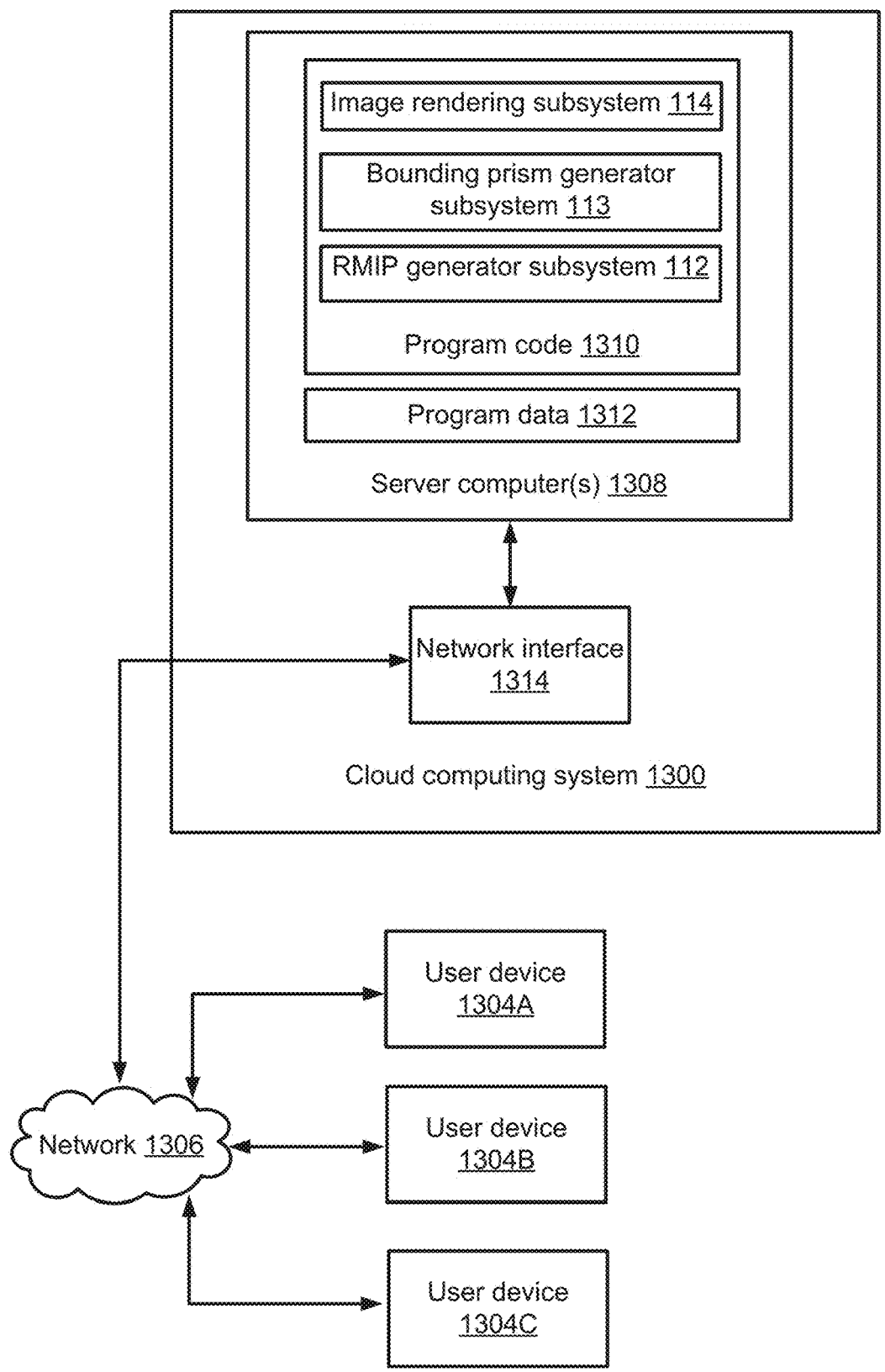
FIG. 13 depicts an example of a cloud computing system that performs certain operations described herein, according to certain embodiments disclosed herein.

In some embodiments, the functionality provided by computer system 1200 may be offered as cloud services by a cloud service provider. For example, FIG. 13 depicts an example of a cloud computer system 1300 offering a service for rendering a 2D image 105 of a scene including a 3D object 101 with a textured surface, that can be used by a number of user subscribers using user devices 1304A, 1304B, and 1304C across a data network 1306. The cloud computer system 1300 performs the processing to provide the service for rendering a 2D image 105 of a scene including a 3D object 101 with a textured surface. The cloud computer system 1300 may include one or more remote server computers 1308.

The remote server computers 1308 include any suitable non-transitory computer-readable medium for storing program code 1310 (e.g., the RMIP generator subsystem 112, the bounding prism generator subsystem 113, and the image rendering subsystem 114 of FIG. 1) and program data 1312, or both, which is used by the cloud computer system 1300 for providing the cloud services. A computer-readable medium can include any electronic, optical, magnetic, or other storage device capable of providing a processing device with executable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 1208 can include volatile memory, non-volatile memory, or a combination thereof.

One or more of the server computers 1308 execute the program code 1310 that configures one or more processing devices of the server computers 1308 to perform one or more of the operations that execute a service for rendering a 2D image 105 of a scene including a 3D object 101 with a textured surface. As depicted in the embodiment in FIG. 13, the one or more servers providing the service for rendering a 2D image 105 of a scene including a 3D object 101 with a textured surface may implement the RMIP generator subsystem 112, the bounding prism generator subsystem 113, and the image rendering subsystem 114. Any other suitable systems or subsystems that perform one or more operations described herein (e.g., one or more development systems for configuring an interactive user interface) can also be implemented by the cloud computer system 1300.

In certain embodiments, the cloud computer system 1300 may implement the services by executing program code and/or using program data 1312, which may be resident in a memory component of the server computers 1308 or any suitable computer-readable medium and may be executed by the processing devices of the server computers 1308 or any other suitable processing device.

In some embodiments, the program data 1312 includes one or more datasets and models described herein. In some embodiments, one or more of data sets, models, and functions are stored in the same memory component. In additional or alternative embodiments, one or more of the programs, data sets, models, and functions described herein are stored in different memory components accessible via the data network 1306.

The cloud computer system 1300 also includes a network interface device 1314 that enable communications to and from cloud computer system 1300. In certain embodiments, the network interface device 1314 includes any device or group of devices suitable for establishing a wired or wireless data connection to the data networks 1306. Non-limiting examples of the network interface device 1314 include an Ethernet network adapter, a modem, and/or the like. The service for rendering a 2D image 105 of a scene including a 3D object 101 with a textured surface is able to communicate with the user devices 1304A, 1304B, and 1304C via the data network 1306 using the network interface device 1314.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method performed by one or more computing devices associated with a scene rendering system, comprising:
generating, based on a triangle mesh structure that models a surface of a three-dimensional (3D) virtual object within 3D virtual scene, a displaced triangle mesh structure comprising one or more displaced surface bounding prisms, each of the one or more displaced surface bounding prisms displaced from a respective base triangle of a plurality of base triangles of the triangle mesh structure based on displacement bounds defined in a displacement bounds data structure for an area of a two-dimensional (2D) texture space corresponding to a location of the respective base triangle defined by the 3D virtual scene; and
performing, using the displaced triangle mesh structure, a ray tracing process for a ray associated with a pixel of a 2D image of the virtual scene, wherein performing the ray tracing process comprises:
responsive to determining that the ray intersects a particular displaced surface bounding prism of the one or more displaced surface bounding prisms in the 3D virtual scene, determining a location of an intersection of the ray in the 2D texture space.

2. The method of claim 1, further performing the ray tracing process further comprises:
defining a value for the pixel based on the determined location of intersection; and
providing for display, via a user interface, the 2D image of the virtual scene comprising the pixel having the defined value.

3. The method of claim 1, wherein the displacement bounds comprise a minimum displacement bound.

4. The method of claim 1, wherein the displacement bounds comprise a maximum displacement bound.

5. The method of claim 1, wherein the displacement bounds data structure comprises a rectangular minmax image pyramid (RMIP) data structure, wherein the area comprises a rectangular area.

6. The method of claim 1, wherein the displacement bounds data structure is generated based on a 2D displacement texture map comprising a plurality of block areas of predetermined size, wherein a size of the area is different from the predetermined size.

7. The method of claim 1, further comprising:
accessing a two-dimensional (2D) displacement texture map defining the texture for at least a region of the surface of the 3D virtual object; and
generating, based on the 2D displacement texture map, the displacement bounds data structure that defines displacement bounds for one or more areas in a texture space associated with the 2D displacement texture map, the one or more areas comprising the area.

8. The method of claim 1, wherein determining that the ray intersects the particular displaced surface bounding prism in the 3D virtual scene comprises determining a first endpoint and a second endpoint of the ray on the particular displaced surface bounding prism, wherein determining a location of an intersection of the ray at the 2D texture space comprises:
determining, based on the determined first endpoint and the determined second endpoint, an initial bounded area in the 2D texture space;
subdividing, at a middle of the initial bounded area of the 2D texture space, the initial bounded area to generate a first subdivided bounded area and a second subdivided bounded area, wherein a path of the ray intersects the first subdivided bounded area prior to intersecting the second subdivided bounded area;
based on the first subdivided bounded area and the second subdivided bounded area, generating a first subdivided axis-aligned bounding box ("AABB") corresponding to the first subdivided bounded area and a second subdivided AABB corresponding to the second subdivided bounded area;
determining that the ray intersects the first subdivided AABB at a first AABB endpoint and at a second AABB endpoint;
determining, based on the determined first AABB endpoint and the determined second AABB endpoint, an updated bounded area in the 2D texture space, wherein the updated bounded area has smaller dimensions than the initial bounded area; and
determining, within the updated bounded area of the 2D texture space, the location.

* * * * *